United States Patent
Higuchi et al.

(10) Patent No.: US 9,547,518 B2
(45) Date of Patent: Jan. 17, 2017

(54) CAPTURE POINT DETERMINATION METHOD AND CAPTURE POINT DETERMINATION SYSTEM

(71) Applicant: FUJITSU LIMITED, Kawasaki-shi, Kanagawa (JP)

(72) Inventors: Junichi Higuchi, Kawasaki (JP); Yuji Nomura, Kawasaki (JP); Yasuhiko Kanemasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 14/665,490

(22) Filed: Mar. 23, 2015

(65) Prior Publication Data
US 2015/0277959 A1 Oct. 1, 2015

(30) Foreign Application Priority Data

Mar. 31, 2014 (JP) ................ 2014-073953

(51) Int. Cl.
*G06F 9/455* (2006.01)
*H04L 12/931* (2013.01)
*G06F 21/53* (2013.01)

(52) U.S. Cl.
CPC .......... *G06F 9/45558* (2013.01); *G06F 21/53* (2013.01); *H04L 49/208* (2013.01); *H04L 49/70* (2013.01); *G06F 2009/45595* (2013.01)

(58) Field of Classification Search
CPC ............... G06F 9/45558; G06F 21/53; G06F 2009/45595; H04L 49/208; H04L 49/70
(Continued)

(56) References Cited

U.S. PATENT DOCUMENTS

| | | | | |
|---|---|---|---|---|
| 7,403,998 B2 * | 7/2008 | Elliott, Jr. | ........... | H04L 12/2602 370/235 |
| 7,796,596 B2 * | 9/2010 | Sheppard | ................ | H04L 29/06 370/370 |

(Continued)

FOREIGN PATENT DOCUMENTS

| | | |
|---|---|---|
| JP | 2006-011683 | 1/2006 |
| JP | 2009-130527 | 6/2009 |
| JP | 2013-175075 | 9/2013 |

OTHER PUBLICATIONS

Jarvinen, Juha, "Testing and Troubleshooting with Passive Network Measurements," Helsinki University of Technology, Jan. 27, 2009, last retrieved from http://lib.tkk.fi/Dipl/2009/urn012974.pdf on Oct. 14, 2016.*

(Continued)

*Primary Examiner* — Wei Zhen
*Assistant Examiner* — Andrew M Lyons
(74) *Attorney, Agent, or Firm* — Fujitsu Patent Center

(57) ABSTRACT

A physical machine calculates, for each virtual switch, an increment of a usage of a processor in accordance with the number of packets to be collected, by using a usage of the processor by a virtual switch and a number of packets passing through each port when mirroring is executed and when mirroring is not executed, respectively. For each of candidates for capture point, the physical machine calculates, for each physical machine, a usage of the processor by a hypervisor when mirroring is executed, by using an increment of a usage of the processor by the virtual switch and a usage of the processor by the hypervisor when mirroring is not executed. The physical machine determines a combination of ports used for collection of packets from (Continued)

among the candidates for capture point, in accordance with a deviation of the calculated usage of the processor by each hypervisor.

7 Claims, 20 Drawing Sheets

(58) Field of Classification Search
USPC .............................. 709/223, 224, 226; 718/1
See application file for complete search history.

(56) References Cited

U.S. PATENT DOCUMENTS

| | | | | |
|---|---|---|---|---|
| 8,806,487 | B2* | 8/2014 | Zhang | G06F 9/5083 718/1 |
| 8,984,125 | B2* | 3/2015 | Kanemasa | G06F 9/5083 709/201 |
| 2005/0289231 | A1 | 12/2005 | Harada et al. | |
| 2006/0200819 | A1* | 9/2006 | Cherkasova | G06F 9/45533 718/1 |
| 2008/0028399 | A1* | 1/2008 | Gupta | G06F 9/5077 718/1 |
| 2010/0223397 | A1* | 9/2010 | Elzur | H04L 41/0213 709/235 |
| 2011/0080829 | A1* | 4/2011 | Breslin | H04L 12/26 370/235 |
| 2012/0124200 | A1* | 5/2012 | Ramadass | H04L 63/1408 709/224 |
| 2012/0317276 | A1* | 12/2012 | Muniraju | H04L 41/14 709/224 |
| 2013/0041934 | A1* | 2/2013 | Annamalaisami | H04L 43/026 709/203 |
| 2013/0173784 | A1* | 7/2013 | Wang | H04L 43/026 709/224 |
| 2013/0227566 | A1* | 8/2013 | Higuchi | G06F 9/45533 718/1 |
| 2013/0326054 | A1* | 12/2013 | Kulkarni | H04L 29/0899 709/224 |
| 2014/0003249 | A1* | 1/2014 | Cai | H04L 43/10 370/241 |
| 2014/0115166 | A1* | 4/2014 | Kucharczyk | H04L 63/1425 709/226 |
| 2014/0280887 | A1* | 9/2014 | Kjendal | H04L 43/12 709/224 |
| 2014/0317623 | A1* | 10/2014 | Yokoyama | H04L 47/10 718/1 |
| 2014/0351415 | A1* | 11/2014 | Harrigan | H04L 43/028 709/224 |
| 2015/0085694 | A1* | 3/2015 | Agarwal | H04L 43/04 370/253 |
| 2015/0100962 | A1* | 4/2015 | Morita | G06F 9/45558 718/1 |
| 2016/0299776 | A1* | 10/2016 | Richards | G06F 9/45558 |

OTHER PUBLICATIONS

Jhatakia, Dharmraj B., "Network Packet Monitoring Optimizations in Data Centre," Happiest Minds Technologies, Mar. 2014, last retrived from http://www.happiestminds.com/whitepapers/network-packet-monitoring-optimizations-in-data-centre.pdf on Oct. 14, 2016.*

Nortel Networks, "Configuration—System Monitoring," Apr. 27, 2009, last retrieved from https://downloads.avaya.com/css/P8/documents/100095984 on Oct. 14, 2016.*

Rajesh K., "Port Mirroring in Switches and In-line network taps," excITingIP.com, Jul. 7, 2009, last retrieved from http://www.excitingip.com/330/port-mirroring-in-switches-and-in-line-network-taps/ on Oct. 14, 2016.*

Sridharan et al., "Achieving Near-Optimal Traffic Engineering Solutions for Current OSPF/IS-IS Networks," IEEE/ACM Transactions on Networking, vol. 13, No. 2, Apr. 2005, pp. 234-247.*

Zhang, Jian and Moore, Andrew, "Traffic Trace Artifacts due to Monitoring via Port Mirroring," IEEE, 2007, last retrieved from http://www.cl.cam.ac.uk/~awm22/publications/zhang2007traffic.pdf on Oct. 14, 2016.*

* cited by examiner

FIG. 9

EXAMPLE OF INFORMATION ABOUT COLLECTED PACKETS
(vSW1-1: PORT NUMBER 2)                                    122a

...

1  2014/02/01 01:58:19 (132290) 192.168.1.100:51272 -> 192.168.1.1:10443 Request HTTP,
   POST /cgi-bin/AXXPF3943?_type=0016&_zid=AXXG13130&_sid=LigkVcFasr8A&_uid=1192

2  2014/02/01 01:58:21 (132290) 192.168.1.100:51272 <- 192.168.1.1:10443 Response HTTP,200

3  2014/02/01 01:58:23 (132291) 192.168.1.101:51272 -> 192.168.1.1:10444 Request HTTP,
   POST /cgi-bin/BPF?_type=0001&_uid=3454

4  2014/02/01 01:58:24 (132292) 192.168.1.102:51272 -> 192.168.1.1:10445 Request HTTP,
   POST /cgi-bin/RXYHA?_type=0134&_sid=fBsaIs87&_uid=3278

5  2014/02/01 01:58:25 (132291) 192.168.1.101:51272 <- 192.168.1.1:10444 Response HTTP,200

6  2014/02/01 01:58:25 (132292) 192.168.1.102:51272 <- 192.168.1.1:10445 Response HTTP,200

| CAPTURE POINT CANDIDATE TABLE 122b | | | | |
|---|---|---|---|---|
| CANDIDATE NUMBER | CAPTURE-TARGET PORT NUMBER | | | |
| | vSW1-1 | vSW2-1 | vSW3-1 | vSW3-2 |
| 1 | 2, 4 | 2, 4 | 2 | 2 |
| 2 | 2, 4, 5 | 2, 4, 5 | 2 | — |
| 3 | 2, 3 | 2, 3 | 2, 3 | 2 |
| 4 | 2, 3, 5 | 2, 3, 5 | 2, 3 | — |

FIG. 11

| MEASUREMENT TABLE (WHEN MIRRORING IS OFF) | | | | 122c |
|---|---|---|---|---|
| SWITCH NAME | PORT NUMBER | NUMBER OF PACKETS | CPU USAGE RATE (vSW) [%] | CPU USAGE RATE (HV) [%] |
| vSW1-1 | 2 | 10000 | 6.45 | 60 |
|  | 3 | 5000 |  |  |
|  | 4 | 8000 |  |  |
|  | 5 | 20000 |  |  |
| vSW2-1 | 2 | 12000 | 8.10 | 50 |
|  | 3 | 6000 |  |  |
|  | 4 | 11000 |  |  |
|  | 5 | 25000 |  |  |
| vSW3-1 | 2 | 11000 | 2.85 | 70 |
|  | 3 | 8000 |  |  |
| vSW3-2 | 2 | 45000 | 6.75 |  |

FIG. 12

| MEASUREMENT TABLE (WHEN MIRRORING IS ON) | | | 122d |
|---|---|---|---|
| SWITCH NAME | PORT NUMBER | NUMBER OF PACKETS | CPU USAGE RATE (vSW) [%] |
| vSW1-1 | 2 | 8400 | 6.615 |
| | 3 | 4200 | |
| | 4 | 6800 | |
| | 5 | 16300 | |
| vSW2-1 | 2 | 10000 | 8.25 |
| | 3 | 5200 | |
| | 4 | 9300 | |
| | 5 | 20500 | |
| vSW3-1 | 2 | 9100 | 3.735 |
| | 3 | 6700 | |
| vSW3-2 | 2 | 36800 | 11.04 |

FIG. 19

MEASUREMENT TABLE (WHEN MIRRORING IS OFF) 122c

| SWITCH NAME | PORT NUMBER | NUMBER OF PACKETS | CPU USAGE RATE (HV) [%] |
|---|---|---|---|
| vSW1-1 | 2 | 10000 | 60 |
| | 3 | 5000 | |
| | 4 | 8000 | |
| | 5 | 20000 | |
| vSW2-1 | 2 | 12000 | 50 |
| | 3 | 6000 | |
| | 4 | 11000 | |
| | 5 | 25000 | |
| vSW3-1 | 2 | 11000 | 70 |
| | 3 | 8000 | |
| vSW3-2 | 2 | 45000 | |

CPU USAGE RATE TABLE 122e

| SWITCH NAME | CPU USAGE [%/PACKET] |
|---|---|
| vSW1-1 | 0.00008 |
| vSW2-1 | 0.00008 |
| vSW3-1 | 0.00015 |
| vSW3-2 | 0.00015 |

ESTIMATED CPU USAGE RATE TABLE 122f

| CANDI-DATE NUMBER | ESTIMATED CPU USAGE RATE [%] | | |
|---|---|---|---|
| | SV1 | SV2 | SV3 |
| 2 | 63.04 | 53.84 | 71.65 |

CAPTURE POINT DETERMINATION METHOD AND CAPTURE POINT DETERMINATION SYSTEM

CROSS-REFERENCE TO RELATED APPLICATION

This application is based upon and claims the benefit of priority of the prior Japanese Patent Application No. 2014-073953, filed on Mar. 31, 2014, the entire contents of which are incorporated herein by reference.

FIELD

Embodiments disclosed herein relate to capture point determination methods and capture point determination systems.

BACKGROUND

In the field of information processing, a virtualization technology has been utilized for operating a plurality of virtual computers (may be referred to as virtual machines or logical hosts) on a physical computer (may be referred to as a physical machine or a physical host). On each virtual machine, software, such as an OS (Operating System), may be executed. A physical machine using the virtualization technology executes software for managing a plurality of virtual machines.

For example, software called a hypervisor assigns the processing capacity of a CPU (Central Processing Unit) and a storage area of a RAM (Random Access Memory) to a plurality of virtual machines, as the resources for computation. Moreover, a hypervisor may use the above resources to operate a virtual switch, which relays the communication data of a virtual machine, on a physical machine.

A system including a plurality of physical machines may collect the packets transmitted and received between virtual machines to monitor the operational status of the system. The packets may be collected using a mirroring function (a function to duplicate a packet passing through a certain port and send it also from another port) of a switch that relays packets. For example, there is a proposal that the arrangement of virtual machines is modified so that the packets between virtual machines on each physical machine may be collected in an aggregated manner from a virtual switch on any one of physical machines, thereby collecting the packets from this virtual switch.

There is also a proposal that, when there is a physical NIC (Network Interface Card) whose usage rate is higher than an upper limit among the physical NICs on a virtual machine server, the connection destination of a virtual NIC of a virtual machine with the lowest priority among the virtual machines in operation is switched to a physical NIC whose usage rate is lower than the upper limit.

Japanese Laid-open Patent Publication No. 2013-175075
Japanese Laid-open Patent Publication No. 2009-130527

As with the above-described proposals, packets may be collected by mirroring a predetermined port using a virtual switch on one physical machine. However, in this case, the load on a physical machine in charge of collecting packets might increase. Then, the collection of packets may be shared among physical machines. Specifically, it is conceivable that a port to be monitored is individually mirrored using a virtual switch on each physical machine, so that packets are collected by a predetermined virtual machine on the same physical machine as that of each virtual switch.

However, the transmitted and received amount of packets between virtual machines differs with a function realized by a virtual machine, the frequency of use of a virtual machine, or the like. Focusing on the ports of a virtual switch, there are various ports, such as a port having a relatively high communication traffic and a port having a relatively low communication traffic. Therefore, depending on a combination of mirroring ports, the number of packets to be duplicated/collected on any one of physical machines might increase and thus the load might be biased to this physical machine.

SUMMARY

According to an aspect of the embodiments, there is provided a capture point determination method in a system including a first physical machine including a first processor and a plurality of second physical machines each including a second processor capable of executing a hypervisor that operates a virtual machine and a virtual switch, the method including: obtaining, by the first processor, a plurality of candidates for a combination of ports of each virtual switch through which packets transmitted and received between the virtual machines are collected, and calculating, for each virtual switch, an increment of a usage of the second processor in accordance with a number of packets to be collected, by using a usage of the second processor by the virtual switch and a number of packets passing through each port when mirroring is executed and when mirroring is not executed, respectively; calculating, by the first processor, for each of the second physical machines, a usage of the second processor by the hypervisor when mirroring is executed, by using a calculated increment of a usage of the second processor by the virtual switch and a usage of the second processor by the hypervisor when mirroring is not executed, for each of the plurality of candidates; and determining, by the first processor, a combination of ports used for collection of packets, from among the plurality of candidates in accordance with a deviation of the usage of the second processor by each hypervisor calculated for each candidate.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of the information about packets to be collected;

FIG. 10 illustrates an example of a capture point candidate table;

FIG. 11 illustrates an example of a measurement table (when mirroring is off);

FIG. 12 illustrates an example of the measurement table (when mirroring is on);

FIG. 19 illustrates an example of estimating a CPU usage rate; and

DESCRIPTION OF EMBODIMENTS

Hereinafter, embodiments disclosed herein will be described with reference to the accompanying drawings.

First Embodiment

Figure 1:
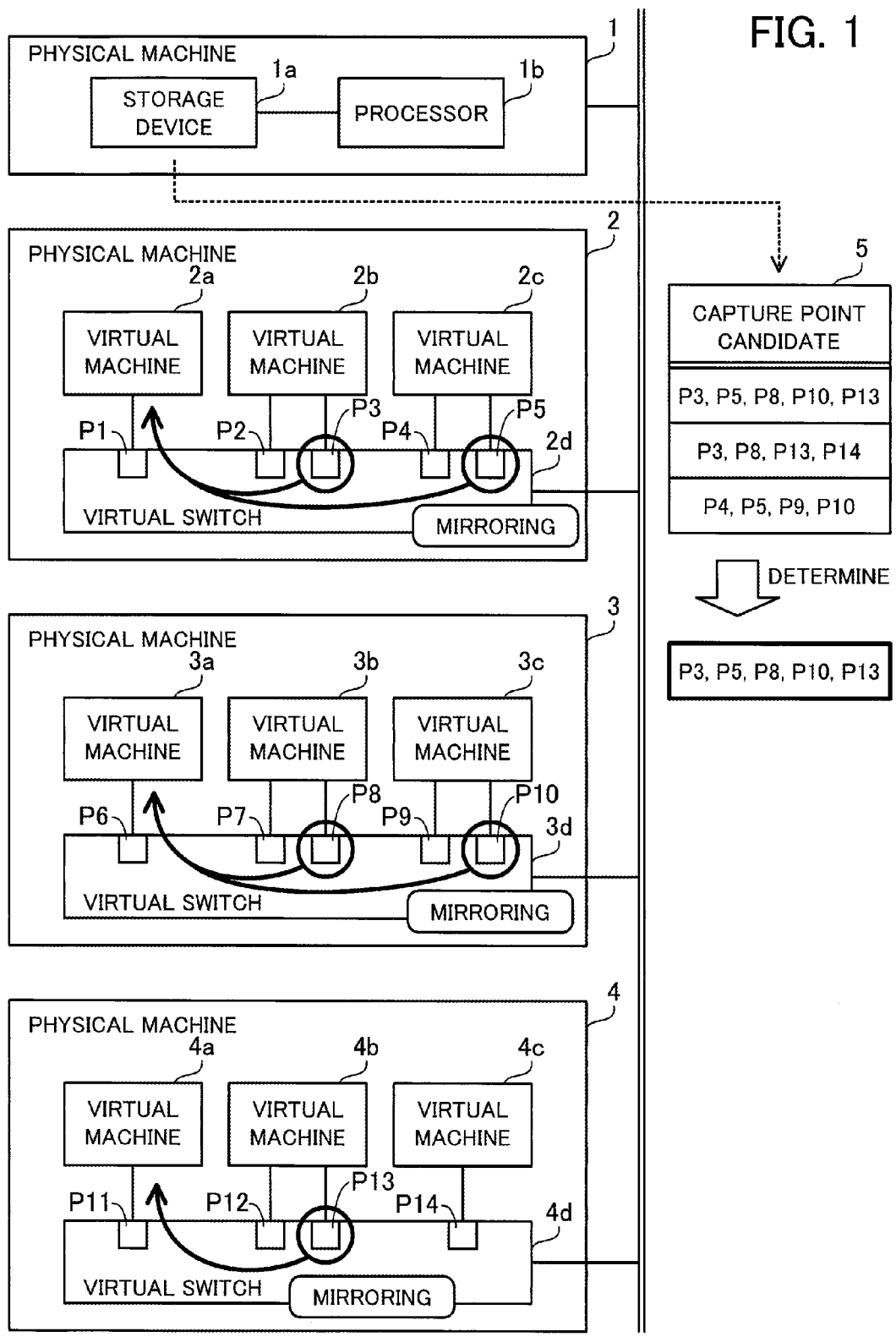
FIG. 1 illustrates an example of a capture point determination system of a first embodiment.

FIG. 1 illustrates an example of a capture point determination system of a first embodiment. The capture point determination system includes physical machines 1, 2, 3, and 4. The physical machines 1, 2, 3, and 4 are connected to a network so as to be able to communicate with each other. The physical machines 1, 2, 3, and 4 are physical computers each including a memory and a processor. Each processor is capable of executing a hypervisor that operates virtual machines and a virtual switch. The physical machine 1 includes a storage device 1a and a processor 1b.

The storage device 1a may be a volatile storage device, such as a RAM, or may be a nonvolatile storage device, such as an HDD (Hard Disk Drive) or a flash memory. The processor 1b may include a CPU, a DSP (Digital Signal Processor), an ASIC (Application Specific Integrated Circuit), an FPGA (Field Programmable Gate Array), and the like. The processor 1b may execute programs. The processor 1b may also include a set of a plurality of processors (a multiprocessor). The physical machines 2, 3, and 4 each similarly include such a storage device and a processor.

The physical machine 2 includes virtual machines 2a, 2b, and 2c and a virtual switch 2d. The physical machine 3 includes virtual machines 3a, 3b, and 3c and a virtual switch 3d. The physical machine 4 includes virtual machines 4a, 4b, and 4c and a virtual switch 4d. In FIG. 1, the illustration of a hypervisor on each physical machine is omitted.

The virtual machines 2a, 2b, 2c, 3a, 3b, 3c, 4a, 4b, and 4c (respective virtual machines) are virtual computers that operate on physical machines. The virtual machines 2a, 3a, and 4a collect the packets transmitted and received by the virtual machines 2b, 2c, 3b, 3c, 4b, and 4c to monitor the operational status of the system. The virtual machines 2b, 2c, 3b, 3c, 4b, and 4c cooperate with each other via the network to provide a predetermined service to a client computer and the like connected to the network.

The virtual switches 2d, 3d, and 4d are relay units that relay the communications among the virtual machines 2a, 2b, 2c, 3a, 3b, 3c, 4a, 4b, and 4c (the respective virtual machines). The virtual switch 2d includes ports P1, P2, P3, P4, and P5. The port P1 is connected to the virtual machine 2a. The ports P2 and P3 are connected to the virtual machine 2b. The ports P4 and P5 are connected to the virtual machine 2c. The virtual switch 2d duplicates the communication data (packets) passing through a port to be monitored among the ports P2, P3, P4, and P5, and sends the same also from the port P1, so that the duplicated packets may be collected by the virtual machine 2a. This function may be referred to as mirroring or port mirroring. Moreover, the collection of packets using mirroring or the like may be referred to as packet capture.

The virtual switch 3d includes ports P6, P7, P8, P9, and P10. The port P6 is connected to the virtual machine 3a. The ports P7 and P8 are connected to the virtual machine 3b. The ports P9 and P10 are connected to the virtual machine 3c. The virtual switch 3d duplicates the packets passing through a port to be monitored among the ports P7, P8, P9, and P10, and sends the same also from the port P6, so that the duplicated packets may be collected by the virtual machine 3a.

The virtual switch 4d includes ports P11, P12, P13, and P14. The port P11 is connected to the virtual machine 4a. The ports P12 and P13 are connected to the virtual machine 4b. The port P14 is connected to the virtual machine 4c. The virtual switch 4d duplicates the packets passing through a port to be monitored among the ports P12, P13, and P14 and sends the same also from the port P11, so that the duplicated packets may be collected by the virtual machine 4a.

The physical machine 1 determines a combination of ports as a target for packet capture (this combination may be referred to as a capture point) as follows. The storage device 1a stores the information about a plurality of candidates for the combination of ports (the capture point) of each virtual switch that collect the packets transmitted and received among the virtual machines. A combination of ports capable of obtaining all the packets transmitted and received by each virtual machine is a candidate for capture point.

For example, in the first embodiment, it is assumed that the following six pairs of virtual machines carry out communications: a first pair of the virtual machines 2b and 2c, the communication of the first pair is performed via the ports P3 and P4; a second pair of the virtual machines 2c and 3b, the communication of the second pair is performed via the ports P4 and P8; a third pair of the virtual machines 3b and 3c, the communication of the third pair is performed via the ports P8 and P9; a fourth pair of the virtual machines 3c and 4b, the communication of the fourth pair is performed via the ports P9 and P13; a fifth pair of the virtual machines 2c and 4c, the communication of the fifth pair is performed via the ports P5 and P14; and a sixth pair of the virtual machines 3c and 4c, the communication of the sixth pair is performed via the ports P10 and P14.

In this case, as the capture points, the following candidates may be contemplated: a first candidate is a combination of the ports P3, P5, P8, P10, and P13; a second candidate is a combination of the ports P3, P8, P13, and P14; and a third candidate is a combination of the ports P4, P5, P9, and P10. For example, the storage device 1a stores information 5 indicative of the determined capture point candidates.

With reference to the information of the storage device 1a, the processor 1b measures, for each virtual switch, a usage of the processor by a virtual switch and the number of packets passing through each port when the mirroring using any one of the candidates for capture point is executed and when the mirroring is not executed, respectively. The processor 1b calculates, for each virtual switch, an increment of the usage of the processor in accordance with the number of packets to be collected, by using the measured information.

For example, in the case of the first candidate for capture point, the mirroring ports are the ports P3, P5, P8, P10, and P13. For example, the processor 1b measures a usage of the processor of the physical machine 2 by the virtual switch 2d when mirroring is executed and when mirroring is not executed, respectively. Moreover, the processor 1b also measures the number of packets passing through the ports P2, P3, P4, and P5. The processor 1b may cause the virtual machine 2a to measure the information of the number of packets, and may obtain the measurement result from the virtual machine 2a. Using the measured information, the processor 1b calculates an increment of the usage of the processor of the physical machine 2 by the virtual switch 2d in accordance with the number of packets to be collected. For example, an increment of the usage of the processor by the virtual switch 2d associated with the collection per packet may be calculated.

Similarly, the processor 1b measures, with regard to the virtual switches 3d and 4d, a usage of the processor of each of the physical machines 3 and 4 and the number of packets passing through the ports P7, P8, P9, P10, P12, P13, and P14 when mirroring is executed and when mirroring is not executed, respectively. Then, an increment of the usage of the processor in accordance with the number of packets to be collected is calculated for each of the virtual switches 3d and 4d using the measured information.

For each of a plurality of candidates for capture point, the processor 1b calculate, for each physical machine, the usage of the processor by the hypervisor when mirroring is executed, by using an increment of the usage of the processor by the virtual switch in accordance with the number of collected packets and the usage of the processor by the hypervisor when mirroring is not executed.

The number of packets passing through each port and an increment of the usage of the processor for each virtual switch in accordance with the number of packets to be collected are already revealed by the above-described procedure. Therefore, the processor 1b is able to estimate the usage of the processor by the hypervisor on each physical machine when a first candidate, second candidate, and third candidate for capture point are selected, respectively.

For example, the processor 1b estimates a usage U11 of the processor of the physical machine 2 by the hypervisor of the physical machine 2 during collection of packets when the first candidate is selected. Similarly, a usage U12 of the processor by the hypervisor of the physical machine 3 and a usage U13 of the processor by the hypervisor of the physical machine 4 are also estimated.

Moreover, the processor 1b estimates a usage U21 of the processor of the physical machine 2 by the hypervisor of the physical machine 2 during collection of packets when a second candidate is selected. Similarly, a usage U22 of the processor by the hypervisor of the physical machine 3 and a usage U23 of the processor by the hypervisor of the physical machine 4 are also estimated.

Furthermore, the processor 1b estimates a usage U31 of the processor of the physical machine 2 by the hypervisor of the physical machine 2 during collection of packets when a third candidate is selected. Similarly, a usage U32 of the processor by the hypervisor of the physical machine 3 and a usage U33 of the processor by the hypervisor of the physical machine 4 are also estimated.

The processor 1b determines a combination of ports used for collection of packets from among the plurality of candidates in accordance with a deviation of the usage of the processor by each hypervisor that is calculated for each capture point candidate. For example, a combination of ports indicated by a candidate, in which the standard deviation (or dispersion) calculated for each candidate becomes the minimum, may be determined as the combination of ports used for collection of packets.

More specifically, with regard to the first candidate, the processor 1b calculates a standard deviation $\sigma 1$ of the usages U11, U12, and U13 of the processor during collection of packets performed by each hypervisor. Similarly, with regard to the second candidate, the processor 1b calculates a standard deviation $\sigma 2$ of the usages U21, U22, and U23 of the processor during collection of packets performed by each hypervisor. Similarly, with regard to the third candidate, the processor 1b calculates a standard deviation $\sigma 3$ of the usages U31, U32, and U33 of the processor during collection of packets performed by each hypervisor.

For example, if the standard deviations have a relation of $\sigma 1 < \sigma 2 < \sigma 3$, the processor 1b determines the ports P3, P5, P8, P10, and P13 corresponding to the first candidate for capture point, as a combination of ports to be used for collection of packets. Note that one of the physical machines 2, 3, and 4 may execute the processing of the physical machine 1 of the first embodiment.

According to a capture point determination system of the first embodiment, a plurality of candidates for capture point is obtained. Using a usage of a processor by a virtual switch and the number of packets passing through each port when mirroring is executed and when the mirroring is not executed, respectively, an increment of the usage of the processor in accordance with the number of packets to be collected is calculated for each virtual switch. With respect to each candidate for capture point, using the calculated increment of the usage of the processor by the virtual switch and a usage of the processor by the hypervisor when mirroring is not executed, a usage of the processor by the hypervisor when mirroring is executed is calculated for each physical machine. In accordance with a deviation of the usage of the processor by each hypervisor that is calculated for each candidate, a combination of ports used for collection of packets is determined from among a plurality of candidates. This enables to equalize the loads on the physical machines 2, 3, and 4.

Here, when collection of packets is shared and executed by each of the physical machines, the number of packets to be duplicated/collected on any of the physical machines might increase and the load might be biased to this physical machine. This is because the transmitted and received amount of packets between virtual machines differs with a function realized by a virtual machine, the frequency of use of a virtual machine, or the like, and when ports of a virtual switch are focused, there are various ports, such as a port having a relatively high communication traffic and a port having a relatively low communication traffic.

For example, by appropriately selecting a capture point, a load may be prevented from being biased to a specific physical machine. However, it is not easy to directly measure how much load on a processor due to mirroring is in each physical machine.

Then, in a method of the first embodiment, for a plurality of candidates for capture point, a usage of a processor by each hypervisor when each candidate is adopted is estimated. This enables to select a capture point without a deviation in the usage of the processor by each hypervisor.

Then, an increment of the usage of a processor by a virtual switch in accordance with the number of packets to be collected is calculated. Therefore, from the number of packets passing through each port (the number corresponding to the number of packets to be collected when the each port is set to the port to be mirrored), the usage of a processor by each hypervisor when each candidate for capture point is adopted may be estimated. Accordingly, there is no need to measure, for all the candidates for capture point, the usage of a processor of a hypervisor when mirroring is executed and when mirroring is not executed, respectively. Therefore, a capture point is determined efficiently.

Second Embodiment

Figure 2:
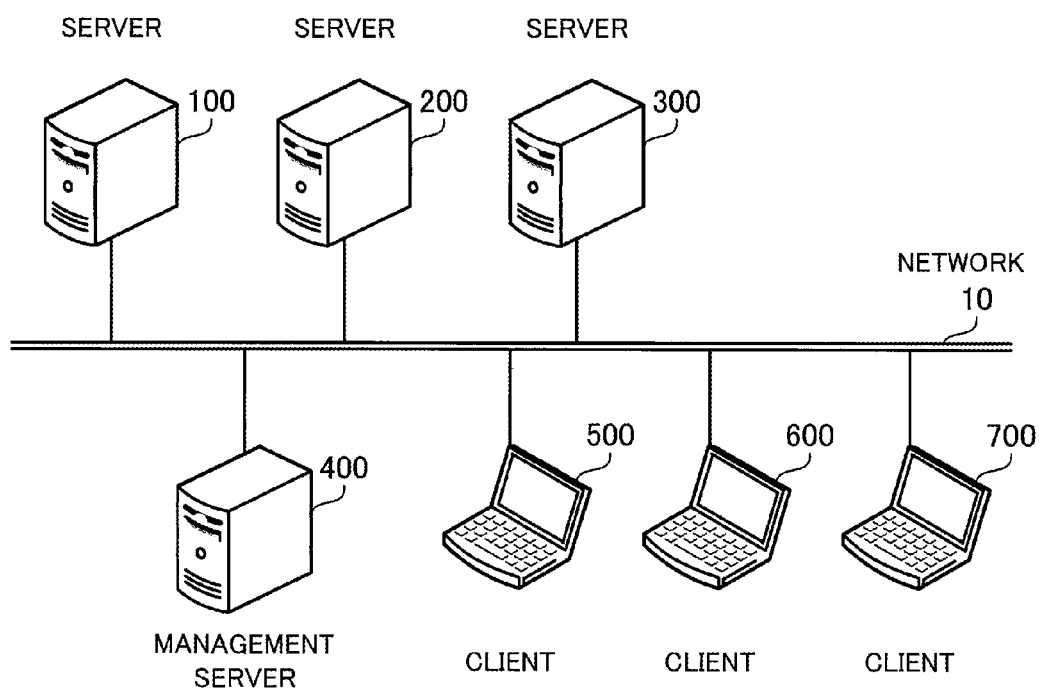
FIG. 2 illustrates an example of an information processing system of a second embodiment.

FIG. 2 illustrates an example of an information processing system of a second embodiment. The information processing system of the second embodiment includes servers 100, 200, and 300, a management server 400, and clients 500, 600, and 700. Each of these devices is connected to a network 10. The network 10 is a LAN (Local Area Network), for example. Note that, the clients 500, 600, and 700 may be connected to the network 10 via a wide area network, such as a WAN (Wide Area Network) or the Internet. In the information processing system of the second embodiment, Web services provided by the servers 100, 200, and 300 are available for the clients 500, 600, and 700. Virtual machines operating on the servers 100, 200, and 300 cooperate with each other to realize a predetermined Web service.

Here, a Web service is executed by cooperation of the following three functions: a Web server function; an AP (APplication) server function; and a DB (DataBase) server function. The Web server function provides, for example, a GUI (Graphical User Interface) and the like. The AP server function provides a logical function specific to business, for example. The DB server function provides a function to manage data used for business, for example.

The servers 100, 200, and 300 are physical server computers (physical servers) on each of which a virtual machine and a virtual switch may operate.

The management server 400 is a server computer that manages the loads on the servers 100, 200, and 300 and the operational status of Web services. The clients 500, 600, and 700 are client computers that access the Web services provided by the servers 100, 200, and 300. For example, a web browser executed by each of the clients 500, 600, and 700 accesses a Web service in response to an operation of a user.

Figure 3:
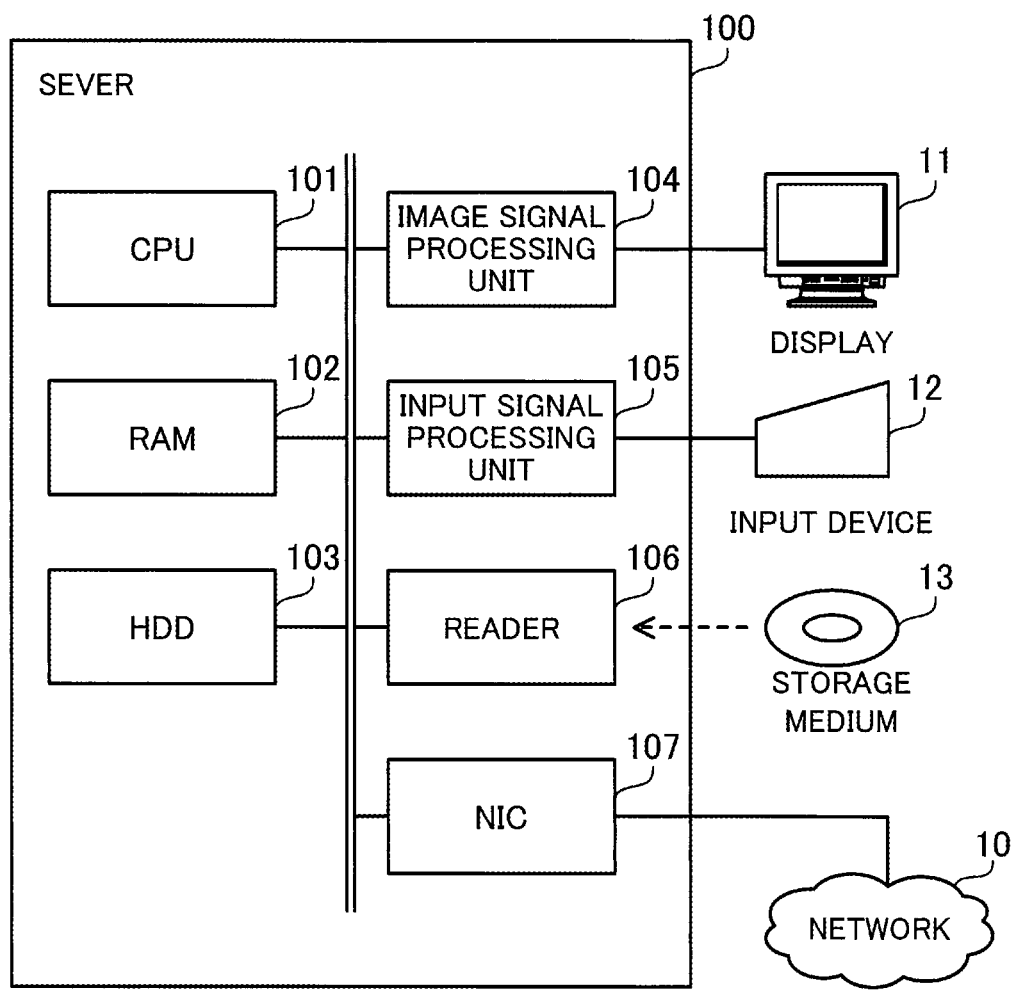
FIG. 3 illustrates an example of hardware of a server.

FIG. 3 illustrates an example of the hardware of the server. The server 100 includes a CPU 101, a RAM 102, an HDD 103, an image signal processing unit 104, an input signal processing unit 105, a reader 106, and an NIC 107. Each of these units is connected to a bus of the server 100.

The CPU 101 is a processor that controls the whole of the server 100. The CPU 101 may be a multiprocessor.

The RAM 102 is the main storage device of the server 100. The RAM 102 temporarily stores at least part of the program of an OS and application programs executed by the CPU 101. Moreover, the RAM 102 stores various types of data used for processing performed by the CPU 101.

The HDD 103 is an auxiliary storage device of the server 100. The HDD 103 magnetically writes and reads data to and from a built-in magnetic disc. The program of an OS, application programs, and various types of data are stored in the HDD 103. The server 100 may include another type of auxiliary storage device, such as a flash memory or an SSD (Solid State Drive), or may include a plurality of auxiliary storage devices.

The image signal processing unit 104 outputs an image to a display 11 connected to the server 100, in accordance with an instruction from the CPU 101. Various types of displays, such as a CRT (Cathode Ray Tube) display, a liquid crystal displays (LCD), and an organic EL (Electro-Luminescence) display, may be used as the display 11.

The input signal processing unit 105 obtains an input signal from an input device 12 connected to the server 100, and outputs the same to the CPU 101. Various types of input devices, such as a pointing device, such as a mouse or a touch panel, and a keyboard, may be used as the input device 12. A plurality of types of input devices may be connected to the server 100.

The reader 106 is a device that reads programs and data stored on a storage medium 13. A magnetic disk, such as a flexible disk (FD) or an HDD, an optical disc, such as a CD (Compact Disc) or a DVD (Digital Versatile Disc), or a magneto-optical disk (MO) may be used as the storage medium 13, for example. Moreover, a nonvolatile semiconductor memory, such as a flash memory, may be used as the storage medium 13, for example. The reader 106 stores, for example, the programs and data read from the storage medium 13 into the RAM 102 or HDD 103, in accordance with an instruction from the CPU 101.

The NIC 107 is connected to the network 10 to communicate with other information processing apparatuses. The NIC 107 may be a wired communication interface or may be a wireless communication interface.

Note that, the servers 200 and 300, management server 400, and clients 500, 600, and 700 may be realized using the same hardware as the server 100.

Figure 4:
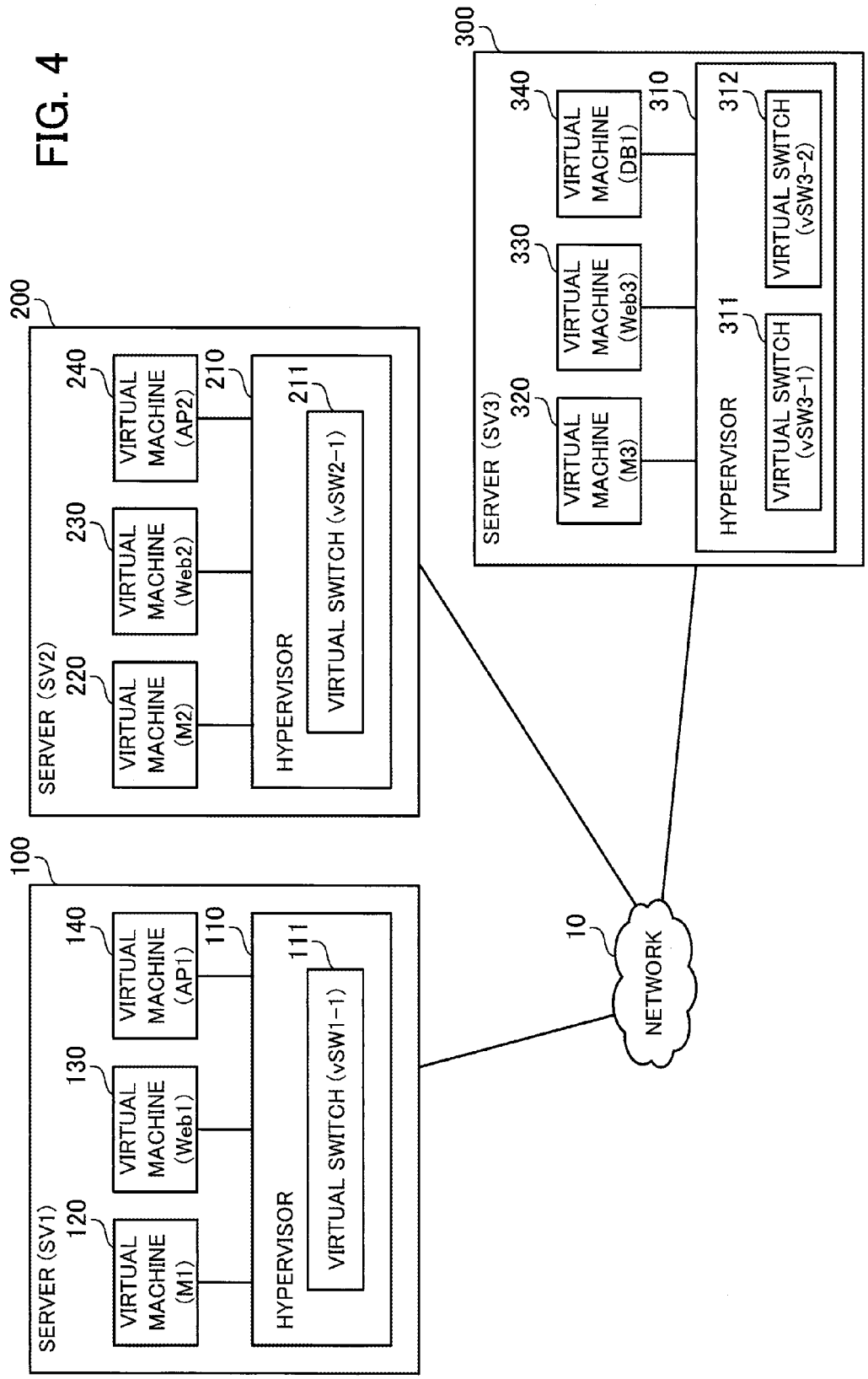
FIG. 4 illustrates an example of the arrangement of virtual machines.

FIG. 4 illustrates an example of the arrangement of virtual machines. The server 100 includes a hypervisor 110 and virtual machines 120, 130, and 140. The hypervisor 110 operates the virtual machines 120, 130, and 140 on the server 100.

The hypervisor 110 controls the allocation of hardware resources to each virtual machine and the activation/suspension of each virtual machine based on an instruction of the management server 400. The hypervisor 110 arbitrates the accesses made by the respective virtual machines to the hardware resources of the server 100. The hypervisor 110 operates a virtual switch 111 on the server 100.

The virtual switch 111 relays the communication data transmitted and received between the virtual machines. The switch name (or identification information) of the virtual switch 111 is "vSW1-1". The expression of "1-1" indicates that another virtual switch may be executed on the server 100 (there may be a virtual switch of "vSW1-2").

The virtual machine 120 is for collecting the communication data, which the virtual switch 111 relays, by mirroring and for monitoring the operational status of Web services. The machine name of the virtual machine 120 is "M1".

The virtual machine 130 is a virtual machine serving as a Web server. The machine name of the virtual machine 130 is "Web1". The virtual machine 140 is a virtual machine serving as an AP server. The machine name of the virtual machine 140 is "AP1".

The server 200 includes a hypervisor 210 and virtual machines 220, 230, and 240. The hypervisor 210 operates the virtual machines 220, 230, and 240 on the server 200. The control contents of the hypervisor 210 for the virtual machines 220, 230, and 240 are the same as those of the hypervisor 110. The hypervisor 210 operates a virtual switch 211 on the server 200.

The virtual switch 211 relays the communication data transmitted and received between the virtual machines. The switch name of the virtual switch 211 is "vSW2-1". The expression of "2-1" indicates that another virtual switch may be executed on the server 200 (there may be a virtual switch of "vSW2-2").

The virtual machine 220 is for collecting the communication data, which the virtual switch 211 relays, by mirroring and for monitoring the operational status of Web services. The machine name of the virtual machine 220 is "M2".

The virtual machine 230 is a virtual machine serving as a Web server. The machine name of the virtual machine 230 is "Web2". The virtual machine 240 is a virtual machine serving as an AP server. The machine name of the virtual machine 240 is "AP2".

The server 300 includes a hypervisor 310 and virtual machines 320, 330, and 340. The hypervisor 310 operates the virtual machines 320, 330, and 340 on the server 300. The control contents of the hypervisor 310 for the virtual machines 320, 330, and 340 are the same as those of the hypervisor 110. The hypervisor 310 operates virtual switches 311 and 312 on the server 300.

The virtual switches 311 and 312 relay the communication data transmitted and received between the virtual machines. The switch name of the virtual switch 311 is "vSW3-1". The switch name of the virtual switch 312 is "vSW3-2".

The virtual machine 320 is for collecting the communication data, which the virtual switches 311 and 312 relay, by mirroring and for monitoring the operational status of Web services. The machine name of the virtual machine 320 is "M3".

The virtual machine 330 is a virtual machine serving as a Web server. The machine name of the virtual machine 330 is "Web3". The virtual machine 340 is a virtual machine serving as a DB server. The machine name of the virtual machine 340 is "DB1".

In the following description, the machine name of the server 100 is "SV1", the machine name of the server 200 is "SV2, and the machine name of server 300 is "SV3". The virtual machine may be abbreviated as a VM (Virtual Machine).

Figure 5:
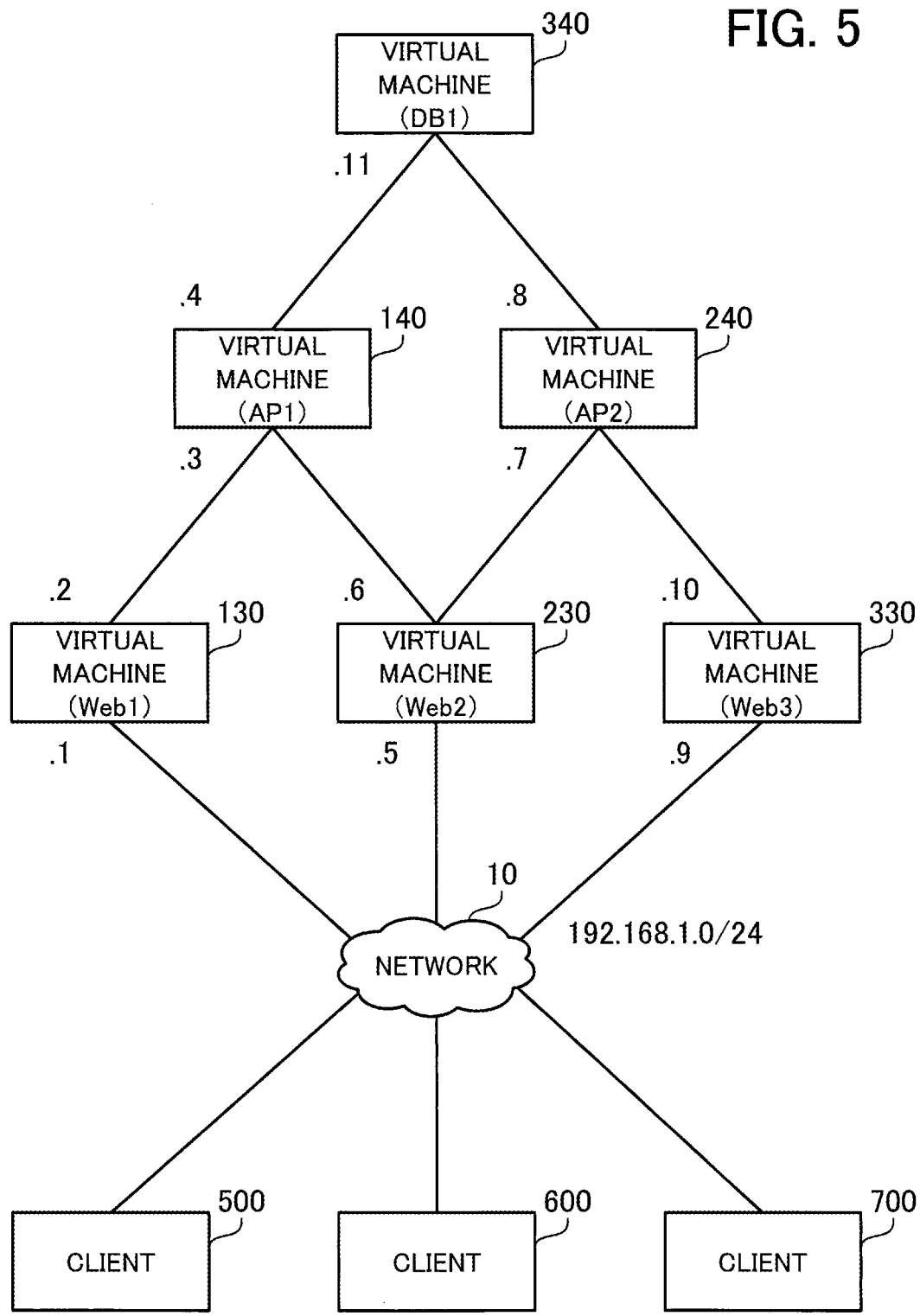
FIG. 5 illustrates an example of the logical communication paths between the virtual machines.

FIG. 5 illustrates an example of the logical communication paths between the virtual machines. In the Web services of the second embodiment, the following pair of virtual machines communicate with each other.

Firstly, there is the communication between the Web server and the AP server. Specifically, there are the following pairs: a pair of virtual machines 130 and 140 (Web1 and AP1); a pair of virtual machines 230 and 140 (Web2 and AP1); a pair of virtual machines 230 and 240 (Web2 and AP2); and a pair of virtual machines 330 and 240 (Web3 and AP2). Note that, the virtual machines 130, 230, and 330 (Web servers) communicate also with clients 500, 600, and 700.

Secondly, there is the communication between the AP server and the DB server. Specifically, there are the following pairs: a pair of virtual machines 140 and 340 (AP1 and DB1); and a pair of virtual machines 240 and 340 (AP2 and DB1).

Here, the network address of the network 10 is "192.168.1.0/24". The IP (Internet Protocol) address assigned to each virtual machine is as follows. Note that, in FIG. 5, among the IP addresses assigned to respective virtual machines, only the value of the least significant bits is illustrated, while the illustration of the upper 24 bits is omitted.

The IP address which the virtual machine 130 uses for communication with the clients 500, 600, and 700 is "192.168.0.1". The IP address which the virtual machine 130 uses for communication with the virtual machine 140 is "192.168.0.2". The IP address which the virtual machine 140 uses for communication with the virtual machines 130 and 230 is "192.168.0.3". The IP address which the virtual machine 140 uses for communication with the virtual machine 340 is "192.168.0.4".

The IP address which the virtual machine 230 uses for communication with the clients 500, 600, and 700 is "192.168.0.5". The IP address which the virtual machine 230 uses for communication with the virtual machines 140 and 240 is "192.168.0.6". The IP address which the virtual machine 240 uses for communication with the virtual machines 230 and 330 is "192.168.0.7". The IP address which the virtual machine 240 uses for communication with the virtual machine 340 is "192.168.0.8".

The IP address which the virtual machine 330 uses for communication with the clients 500, 600, and 700 is "192.168.0.9". The IP address which the virtual machine 330 uses for communication with the virtual machine 240 is "192.168.0.10". The IP address which the virtual machine 340 uses for communication with the virtual machines 140 and 240 is "192.168.0.11".

Figure 6:
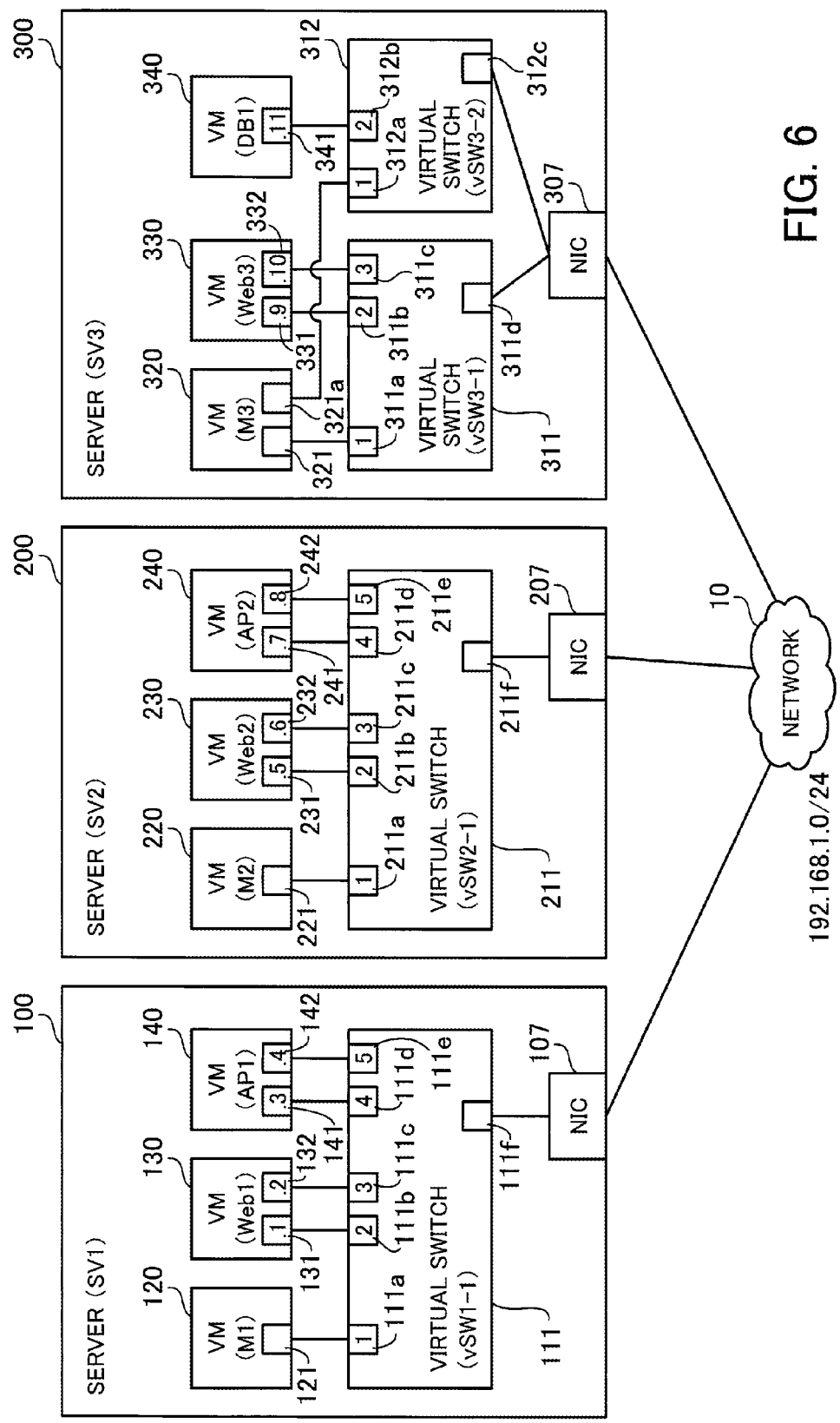
FIG. 6 illustrates an example of the connection relation between a virtual switch and a virtual machine.

FIG. 6 illustrates an example of the connection relation between a virtual switch and a virtual machine. The virtual switch 111 includes ports 111*a*, 111*b*, 111*c*, 111*d*, 111*e*, and 111*f*. The port 111*a* is the virtual communication interface used for communication of the virtual machine 120. The ports 111*b* and 111*c* are the virtual communication interfaces used for communication of the virtual machine 130. The ports 111*d* and 111*e* are the virtual communication interfaces used for communication of the virtual machine 140. The port 111*f* is the virtual communication interface used for each virtual machine to communicate with the servers 200 and 300, management server 400, and clients 500, 600, and 700 via the NIC 107 and network 10.

Here, the port number of the port 111*a* is "1". The port number of the port 111*b* is "2". The port number of the port 111*c* is "3". The port number of the port 111*d* is "4". The port number of the port 111*e* is "5".

The virtual machine 120 includes a vNIC (virtual NIC) 121. The vNIC 121 is the virtual communication interface for communication via the port 111*a*.

The virtual machine 130 includes vNICs 131 and 132. The vNIC 131 is the virtual communication interface for communicating with the clients 500, 600, and 700 via the port 111*b*. IP address ".1" is assigned to the vNIC 131 (Only the value of the least significant 8 bits of the IP address is illustrated. Hereinafter, the same is true). The vNIC 132 is the virtual communication interface for communicating with the virtual machine 140 via the port 111*c*. IP address ".2" is assigned to the vNIC 132.

The virtual machine 140 includes vNICs 141 and 142. The vNIC 141 is the virtual communication interface for communicating with the virtual machines 130 and 230 via the port 111*d*. IP address ".3" is assigned to the vNIC 141. The vNIC 142 is the virtual communication interface for communicating with the virtual machine 340 via the port 111*e*. IP address ".4" is assigned to the vNIC 142.

The virtual switch 211 includes ports 211*a*, 211*b*, 211*c*, 211*d*, 211*e*, and 211*f*. The port 211*a* is the virtual communication interface used for communication of the virtual machine 220. The ports 211*b* and 211*c* are the virtual communication interfaces used for communication of the virtual machine 230. The ports 211*d* and 211*e* are the virtual communication interfaces used for communication of the virtual machine 240. The port 211*f* is the virtual communication interface used for each virtual machine to communicate with the servers 100 and 300, management server 400, and clients 500, 600, and 700 via the NIC 207 of the server 200 and the network 10.

Here, the port number of the port 211a is "1". The port number of the port 211b is "2". The port number of the port 211c is "3". The port number of the port 211d is "4". The port number of the port 211e is "5".

The virtual machine 220 includes a vNIC 221. The vNIC 221 is the virtual communication interface for communication via the port 211a.

The virtual machine 230 includes vNICs 231 and 232. The vNIC 231 is the virtual communication interface for communicating with the clients 500, 600, and 700 via the port 211b. IP address ".5" is assigned to the vNIC 231. The vNIC 232 is the virtual communication interface for communicating with the virtual machines 140 and 240 via the port 211c. IP address ".6" is assigned to the vNIC 132.

The virtual machine 240 includes vNICs 241 and 242. The vNIC 241 is the virtual communication interface for communicating with the virtual machines 230 and 330 via the port 211d. IP address ".7" is assigned to the vNIC 241. The vNIC 242 is the virtual communication interface for communicating with the virtual machine 340 via the port 211e. IP address ".8" is assigned to the vNIC 242.

The virtual switch 311 includes ports 311a, 311b, 311c, and 311d. The port 311a is the virtual communication interface used for communication of the virtual machine 320. The ports 311b and 311c are the virtual communication interfaces used for communication of the virtual machine 330. The port 311d is the virtual communication interface used for each virtual machine to communicate with the servers 100 and 200, management server 400, and clients 500, 600, and 700 via the NIC 307 of the server 300 and the network 10.

Here, the port number of the port 311a is "1". The port number of the port 311b is "2". The port number of the port 311c is "3".

The virtual switch 312 includes ports 312a, 312b and 312c. The port 312a is the virtual communication interface used for communication of the virtual machine 320. The port 312b is the virtual communication interface used for communication of the virtual machine 340. The port 312c is the virtual communication interface used for the virtual machine 340 to communicate with the servers 100 and 200 via the NIC 307 and network 10. Here, the port number of the port 312a is "1". The port number of the port 312b is "2".

The virtual machine 320 includes vNICs 321 and 321a. The vNIC 321 is the virtual communication interface for communication via the port 311a. The vNIC 321a is the virtual communication interface for communication via the port 312a.

The virtual machine 330 includes vNICs 331 and 332. The vNIC 331 is the virtual communication interface for communicating with the clients 500, 600, and 700 via the port 311b. IP address ".9" is assigned to the vNIC 331. The vNIC 332 is the virtual communication interface for communicating with the virtual machine 240 via the port 311c. IP address ".10" is assigned to the vNIC 332.

The virtual machine 340 includes a vNIC 341. The vNIC 341 is the virtual communication interface for communicating with the virtual machines 140 and 240 via the port 312b. IP address ".11" is assigned to the vNIC 341.

Figure 7:
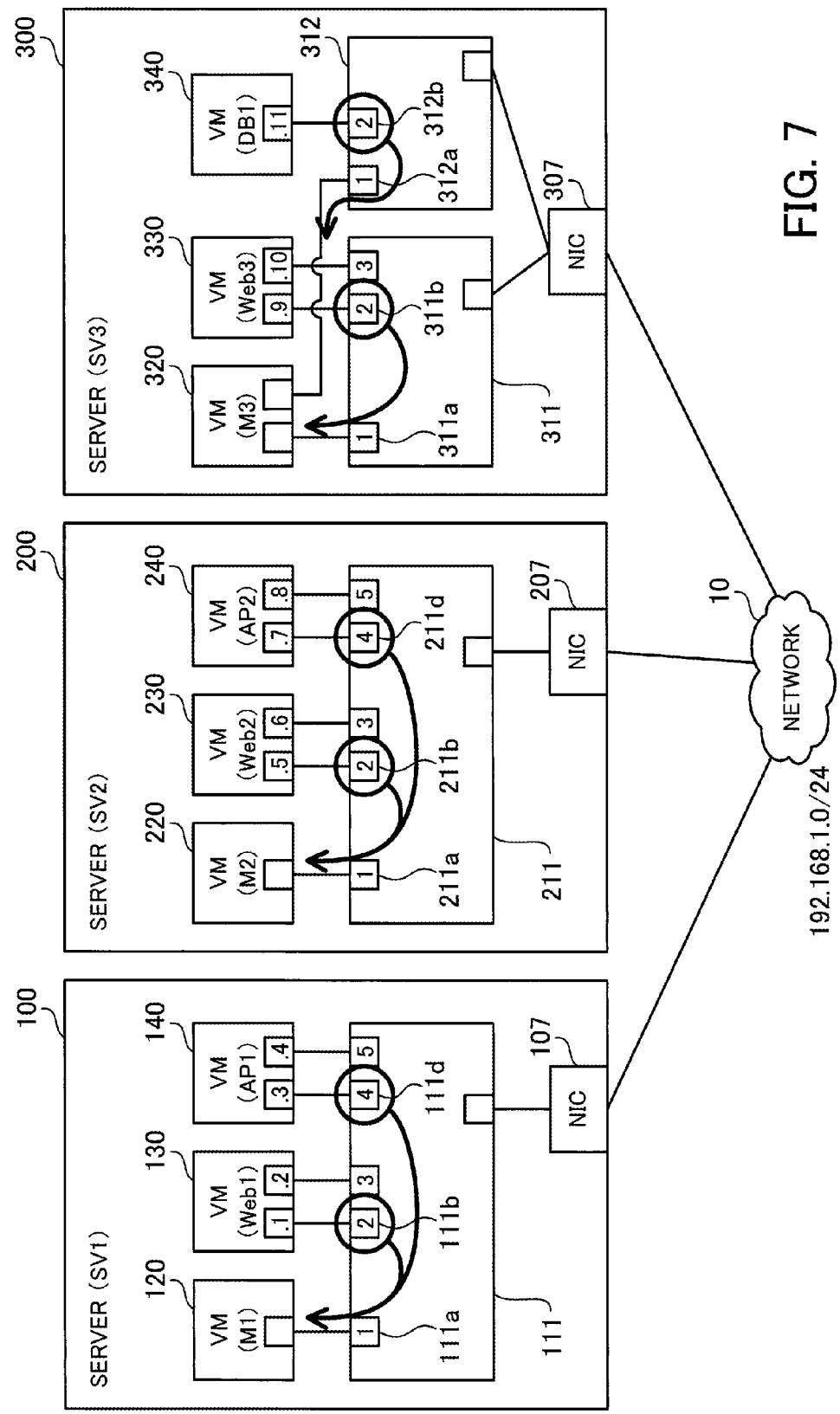
FIG. 7 illustrates an example of packet capture.

FIG. 7 illustrates an example of packet capture. In FIG. 7, part of the illustration of reference numerals for the ports irrelevant to the description is omitted. With respect to the logical communication path of FIG. 5, consider a plurality of candidates for capture point for obtaining all of the packets of communication between virtual machines and the packets of communication between a virtual machine and a client. One of the candidates is a combination of ports 111b, 111d, 211b, 211d, 311b, and 312b. If packets passing through these ports are collected, the virtual switches 111, 211, 311, and 312 may perform mirroring as follows.

The virtual switch 111 duplicates the packets passing through the port 111b, and sends the same also from the port 111a. Similarly, the virtual switch 111 duplicates the packets passing through the port 111d, and sends the same also from the port 111a.

The virtual switch 211 duplicates the packets passing through the port 211b, and sends the same also from the port 211a. Similarly, the virtual switch 211 duplicates the packets passing through the port 211d, and sends the same also from the port 211a.

The virtual switch 311 duplicates the packets passing through the port 311b, and sends the same also from the port 311a. The virtual switch 312 duplicates the packets passing through the port 312b, and sends the same also from the port 312a.

The mirroring method illustrated in FIG. 7 is just an example. The virtual switches 111, 211, and 311 change the ports for mirroring, in accordance with a combination of ports for packet capture.

Figure 8:
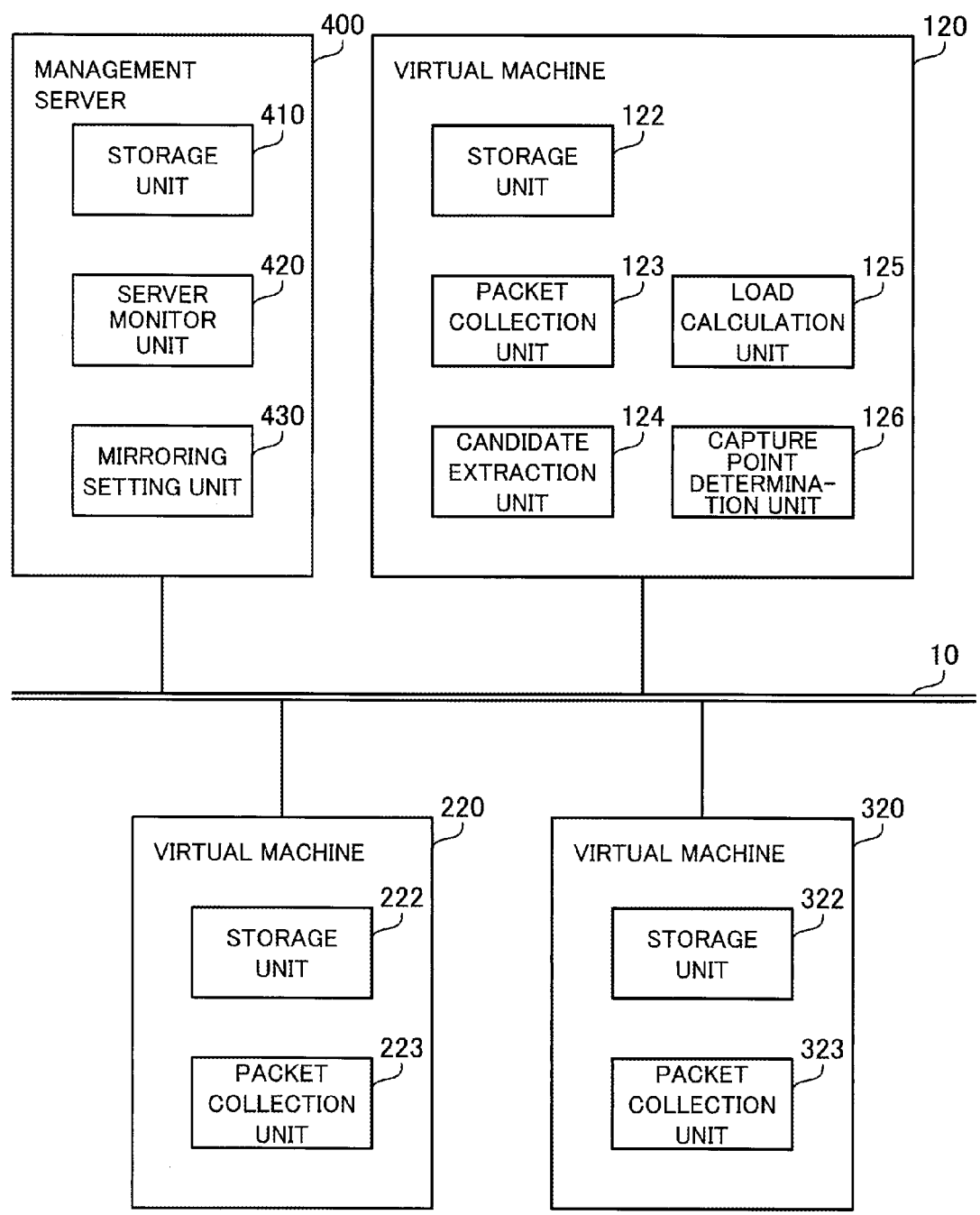
FIG. 8 illustrates a functional example of each machine.

FIG. 8 illustrates a functional example of each machine. Some or all of the units illustrated in FIG. 8 may be program modules executed by CPUs of the servers 100, 200, and 300 and management server 400.

The virtual machine 120 includes a storage unit 122, a packet collection unit 123, a candidate extraction unit 124, a load calculation unit 125, and a capture point determination unit 126.

The storage unit 122 is realized as a storage area secured in the RAM 102 or HDD 103. The storage unit 122 stores various types of information (such as the information about the collected packets) used for the processing performed by the virtual machine 120. The storage unit 122 stores in advance also the information, such as a correspondence between the IP address of each virtual machine and the name of the each virtual machine and the name of a virtual switch operating in each virtual machine.

The packet collection unit 123 collects the packets passing through a predetermined port of the virtual switch 111, and stores the same into the storage unit 122.

The candidate extraction unit 124 extracts the candidates for capture point in the virtual switches 111, 211, 311, and 312 based on the result of packet capture performed by the virtual machines 120, 220, and 320. Specifically, with respect to the connection relation between the virtual machines illustrated in FIG. 5, the candidate extraction unit 124 sets a combination of ports capable of obtaining the communications between all the virtual machines to a candidate for capture point. A plurality of candidates for capture point is obtained as described later. The candidate extraction unit 124 stores the information about capture point candidates into the storage unit 122. The candidate extraction unit 124 may notify the management server 400 of one of capture point candidates and cause the management server 400 to start the mirroring with this capture point candidate.

The load calculation unit 125, in cooperation with the management server 400, measures the resource usages of the hypervisors 110, 210, and 310 and virtual switches 111, 211, 311, and 312 when mirroring is executed (when mirroring is on) and when mirroring is not executed (when mirroring is off), respectively.

The specific contents of the measurement by the load calculation unit 125 are as follows: (1) the number of transmitted and received packets per port of each of the virtual switches 111, 211, 311, and 312 within a predetermined period (e.g., for one minute); and (2) an average of the CPU usage rates of the hypervisors 110, 210, and 310 and virtual switches 111, 211, 311, and 312 within a predetermined period (e.g., for one minute). However, with regard to the hypervisors 110, 210, and 310, the CPU usage rate at least when mirroring is off may be measured. Note that, a total of the CPU resource amounts available to the respective hypervisors 110, 210, and 310 is taken as 100%. The load calculation unit 125 stores the measurement results into the storage unit 122.

Moreover, using the above-described measurement results, the load calculation unit 125 calculates the usage rate of the CPU 101 that is needed for the virtual switch 111 to collect one packet. Similarly, with regard to the virtual switches 211, 311, and 312, the load calculation unit 125 calculates the CPU usage rates of the servers 200 and 300, respectively, which are needed for collecting one packet. The load calculation unit 125 stores the calculation results into the storage unit 122.

Using the CPU usage rate for each virtual switch per packet and the CPU usage rate for each hypervisor when mirroring is off, the capture point determination unit 126 estimates, with respect to each candidate for capture point, the CPU usage rate of each of the hypervisors 110, 210, and 310 when mirroring is on. As previously described, a total of the CPU resource amounts available for the respective hypervisors 110, 210, and 310 is taken as 100%.

The capture point determination unit 126 determines a capture point from among a plurality of capture point candidates based on the estimated result. Specifically, the capture point determination unit 126 determines, as the capture point, a capture point candidate in which the variation of the CPU usage rates of the hypervisors 110, 210, and 310 becomes the minimum. The capture point determination unit 126 may use a dispersion or standard deviation as an indicator indicative of the variation. The capture point determination unit 126 notifies the management server 400 so as to cause the management server 400 to reset the capture point to the determined capture point and perform mirroring.

The virtual machine 220 includes a storage unit 222 and a packet collection unit 223. The storage unit 222 is realized as a storage area secured in a RAM or HDD of the server 200. The storage unit 222 stores various types of information used for processing performed by the virtual machine 220.

The packet collection unit 223 collects the packets passing through a predetermined port of the virtual switch 211, and stores the same into the storage unit 222. The packet collection unit 223 notifies the virtual machine 120 of between which virtual machines a packet passing through each port is transmitted and received. For example, the packet collection unit 223 may notify the virtual machine 120 of the identification information (port number) of a port of the virtual switch 211 and the information about the destination/source IP addresses of a packet transmitted and received via this port.

The virtual machine 320 includes a storage unit 322 and a packet collection unit 323. The storage unit 322 is realized as a storage area secured in a RAM or HDD of the server 300. The storage unit 322 stores various types of information used for processing performed by the virtual machine 320.

The packet collection unit 323 collects the packets passing through predetermined ports of the virtual switches 311 and 312, and stores the same into the storage unit 322. The packet collection unit 323 notifies the virtual machine 120 of between which virtual machines a packet passing through each port is transmitted and received. For example, the packet collection unit 323 may notify the virtual machine 120 of the identification information of a port of each of the virtual switches 311 and 312 and the information about the destination/source IP addresses of a packet transmitted and received via this port.

The management server 400 includes a storage unit 410, a server monitor unit 420, and a mirroring setting unit 430. The storage unit 410 is realized as a storage area secured in a RAM or HDD of the management server 400. The storage unit 410 stores various types of information used for processing performed by the management server 400.

The server monitor unit 420 obtains the CPU usage rates of the hypervisors 110, 210, and 310 from the servers 100, 200, and 300, respectively. The server monitor unit 420 obtains the CPU usage rates of the virtual switches 111, 211, 311, and 312 from the servers 100, 200, and 300, respectively. The server monitor unit 420 obtains the number of packets transmitted and received via each port of the virtual switches 111, 211, 311, and 312 from the servers 100, 200, and 300, respectively. The server monitor unit 420 provides the load calculation unit 125 with the information that is obtained in response to a request from the load calculation unit 125.

Moreover, the server monitor unit 420 obtains the collected packets from the virtual machines 120, 220, and 320 at a predetermined timing (e.g., in a time band during which the frequency of use of Web services is relatively low) to analyze the operational status of the Web services. For the method for monitoring the operational status of the system using the collected packets, see Japanese Laid-open Patent Publication No. 2006-11683.

The mirroring setting unit 430 carries out the setting of mirroring with respect to the virtual switches 111, 211, 311, and 312 to start packet capture performed by the packet collection units 123, 223, and 323. For the capture point specified from the candidate extraction unit 124 and/or the capture point determination unit 126, the mirroring setting unit 430 may perform the setting of mirroring of the virtual switches 111, 211, 311, and 312.

FIG. 9 illustrates an example of the information about packets to be collected. Packet information 122*a* is a set of packets which the packet collection unit 123 captured for the port 111*b*. The packet information 122*a* is stored into the storage unit 122. As previously described, the port 111*b* may be used for Web access between the web browsers on the clients 500, 600, and 700 and the virtual machine 130. Therefore, the packet passing through the port 111*b* includes a message indicative of the Web access. Hereinafter, the packet information 122*a* is specifically described using the line number conveniently labeled on each line of the packet information 122*a*.

For example, a packet of the line number "1" indicates an HTTP (HyperText Transfer Protocol) request from the client 500 (IP address "192.168.1.100") to the virtual machine 130 (IP address "192.168.1.1").

A packet of the line number "2" indicates an HTTP response from the virtual machine 130 to the client 500 in response to the HTTP request of the line number "1".

A packet of the line number "3" indicates an HTTP request from the client 600 (IP address "192.168.1.101") to the virtual machine 130.

A packet of the line number "4" indicates an HTTP request from the client 700 (IP address "192.168.1.102") to the virtual machine 130.

A packet of the line number "5" indicates an HTTP response from the virtual machine 130 to the client 600 in response to the HTTP request of the line number "3".

A packet of the line number "6" indicates an HTTP response from the virtual machine 130 to the client 700 in response to the HTTP request of the line number "4".

In the above description, the port 111b has been illustrated, but the packet collection unit 123 is capable of collecting packets also for the ports 111c, 111d, and 111e in a similar manner.

Moreover, the packet collection unit 223 also collects the packets passing through the ports 211b, 211c, 211d, and 211e, as with the packet collection unit 123. The packet collection unit 323 also collects the packets passing through the ports 311b, 311c, and 312b, as with the packet collection unit 123.

For example, in the case of the communication between the virtual machines 130 and 140, a packet including messages (e.g., IIOP (Internet Inter Object Request Broker Protocol) and the like) used for Web-AP cooperation may be collected. Moreover, in the case of the communication between the virtual machines 140 and 340, a packet including a message used for DB access and the like may be collected. Each packet includes the IP address of a source and the IP address of a destination.

The packet collection units 123, 223, and 323 may cause the virtual switches 111, 211, 311, and 312 to append information indicative of a port to the duplicated packet so as to be able to simultaneously collect the packets of a plurality of ports desired to be collected.

FIG. 10 illustrates an example of a capture point candidate table. A capture point candidate table 122b is generated by the candidate extraction unit 124 and stored into the storage unit 122. The capture point candidate table 122b includes the items of candidate number and capture-target port number.

An identification number for identifying a capture point candidate is set to the item of candidate number. Information about capture point candidates are set to the item of capture-target port number. The capture point candidate is a combination of mirroring ports in the virtual switches 111, 211, 311, and 312.

For example, in the capture point candidate table 122b, there is registered information that the candidate number is "1", the port numbers of the virtual switch 111 (vSW1-1) are "2 and 4", the port numbers of the virtual switch 211 (vSW2-1) are "2 and 4", the port number of the virtual switch 311 (vSW3-1) is "2", and the port number of the virtual switch 312 (vSW3-2) is "2". This indicates that the capture point candidates of the candidate number "1" are a set of the ports 111b, 111d, 211b, 211d, 311b, and 312b.

Note that, depending on the capture point candidates, there may be no mirroring port in any of the virtual switches. In this case, "-" (hyphen) indicative of no setting is put in the item of capture-target port number in the corresponding virtual switch (e.g., in the column of vSW3-2 of the candidate number "2").

FIG. 11 illustrates an example of a measurement table (when mirroring is off). A measurement table 122c is generated by the load calculation unit 125 and stored into the storage unit 122. The measurement table 122c includes the items of switch name, port number, number of packets, CPU usage rate (vSW), and CPU usage rate (HV). Here, vSW is the abbreviation of virtual SWitch, while HV is the abbreviation of HyperVisor.

The name of a virtual switch is registered into the item of switch name. A port number is registered into the item of port number. The number of packets that are transmitted and received via the corresponding port within a predetermined period (e.g., for one minute) is registered into the item of number of packets. An average CPU usage rate of a virtual switch within the same period (e.g., for one minute) is registered into the item of CPU usage rate (vSW). Here, the unit is %. An average CPU usage rate of a hypervisor within the same period (e.g., for one minute) is registered into the item of CPU usage rate (HV).

For example, in the measurement table 122c, there is registered the information that the switch name is "vSW1-1", the port number is "2", the number of packets is "10000", the CPU usage rate (vSW) is "6.45", and the CPU usage rate (HV) is "60". This indicates that the number of packets transmitted and received within a predetermined period via the port 111b is 10000, the average CPU usage rate of the virtual switch 111 within this period is 6.45%, and the average CPU usage rate of the hypervisor 110 is 60%.

FIG. 12 illustrates an example of the measurement table (when mirroring is on). The measurement table 122d is generated by the load calculation unit 125 and stored into the storage unit 122. The measurement table 122d includes the items of switch name, port number, number of packets, and CPU usage rate (vSW). Because the content registered into each of the items is the same as the content registered into the item with the same name of the measurement table 122c, the description thereof is omitted. Note that, as previously described, the CPU usage rates of the hypervisors 110, 210, and 310 when mirroring is on do not need to be measured. Therefore, in the measurement table 122d, the illustration of the item of CPU usage rate (HV) (which exists in the measurement table 122c) is omitted.

Figure 13:
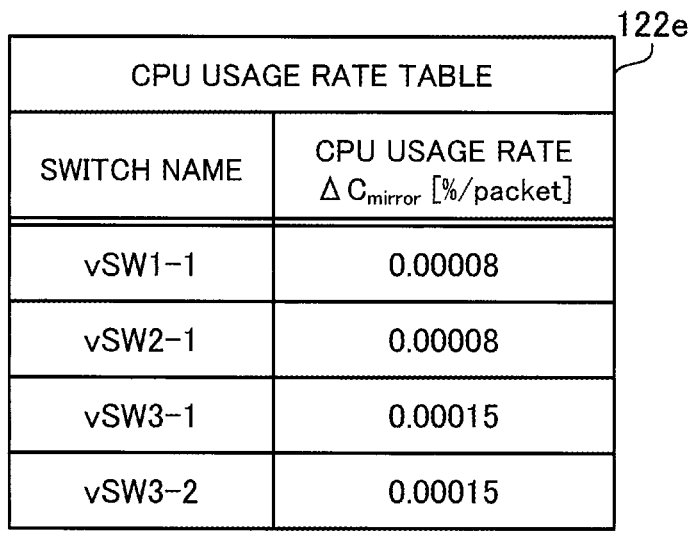
FIG. 13 illustrates an example of a CPU usage rate table.

FIG. 13 illustrates an example of a CPU usage rate table. A CPU usage rate table 122e is generated by the load calculation unit 125 and stored into the storage unit 122. The CPU usage rate table 122e includes the items of switch name and CPU usage rate.

The name of a virtual switch is registered into the item of switch name. A CPU usage rate $\Delta C_{mirror}$ of a virtual switch needed for mirroring per packet is registered into the item of CPU usage rate. Here, the unit is %/packet.

For example, the information that the switch name is "vSW1-1" and the CPU usage rate is "0.00008" is registered into the CPU usage rate table 122e. This indicates that the usage rate of the CPU 101 of the virtual switch 111 needed for mirroring per packet is 0.00008%. This means that the average CPU usage rate within a predetermined period increases by $\Delta C_{mirror}$ 0.00008% when the number of packets to be collected is increased by one within this period.

The load calculation unit 125 may calculate $\Delta C_{mirror}$ based on the measurement tables 122c and 122d using Formula (1).

$$\Delta C_{mirror} = \frac{C_{mirror\_on} - C_{mirror\_off} \frac{p_{mirror\_on\_total}}{p_{mirror\_off\_total}}}{p_{mirror}} \quad (1)$$

Here, $C_{mirror\_off}$ is the CPU usage rate of a virtual switch when mirroring is off. $C_{mirror\_on}$ is the CPU usage rate of a virtual switch when mirroring is on. $p_{mirror\_off\_total}$ is the number of packets transmitted and received by the corresponding virtual switch when mirroring is off (a total number of packets transmitted and received via a port connected to a virtual machine to be monitored). $p_{mirror\_on\_total}$ is the number of packets transmitted and received by the corresponding virtual switch when mirroring is on (a total number of packets transmitted and received via a port connected to a virtual machine to be monitored). $p_{mirror}$ is a total number of packets that are mirrored in the corresponding virtual switch.

That is, in order to estimate the CPU usage rate, any port of all the virtual switches connected to a virtual machine to be monitored will be mirrored.

Formula (1) uses the fact that the communication traffics of virtual machines of a system to be monitored have a substantially proportional relation between virtual machines. Here, it is assumed that a configuration in which only a virtual machine of a system to be monitored is connected to each virtual switch. For example, a ratio of the numbers of packets among ports in the measurement table 122c and a ratio of the numbers of packets among the ports in the measurement table 122d are substantially equal. Formula (1) is explained further in detail as follows.

Figure 14:
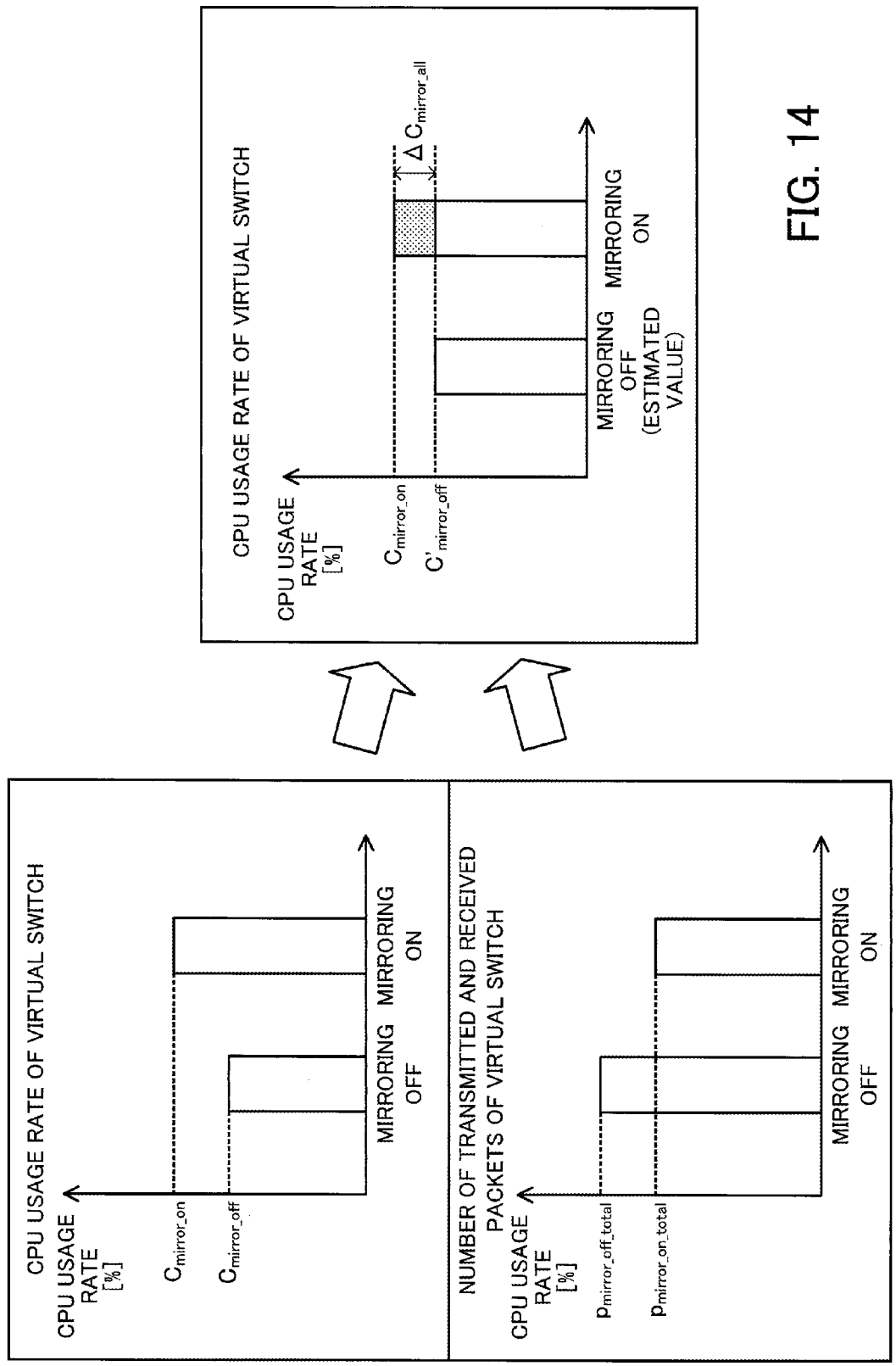
FIG. 14 illustrates an example of calculation of a CPU overhead due to mirroring.

FIG. 14 illustrates an example of calculation of a CPU overhead due to mirroring. The load calculation unit 125 calculates $\Delta C_{mirror}$ for each virtual machine following a procedure below. First, using Formula (2), a CPU usage rate $C_{mirror\_off}$ of a virtual switch when mirroring is off that is obtained by measurement is converted into a CPU usage rate in a case where the number of packets equivalent to the number of packets when mirroring is on are transmitted and received. A value $C'_{mirror\_off}$ after conversion may be the CPU usage rate of a virtual switch that is not due to mirroring when mirroring is on.

$$C'_{mirror\_off} = C_{mirror\_off} \frac{p_{mirror\_on\_total}}{p_{mirror\_off\_total}} \quad (2)$$

Here, it is assumed that the CPU usage rate of a virtual switch is proportional to the number of packets transmitted and received. Next, the CPU usage rate (CPU overhead) due to mirroring is calculated using Formula (3).

$$\Delta C_{mirror\_all} = C_{mirror\_on} - C'_{mirror\_off} \quad (3)$$

Then, using Formula (4), an increment $\Delta C_{mirror}$ of the CPU usage rate due to mirroring per packet is calculated.

$$\Delta C_{mirror} = \frac{\Delta C_{mirror\_all}}{p_{mirror}} \quad (4)$$

The capture point determination unit 126 may calculate a CPU usage rate $C_{mirror\_on\_estimated}$ for each hypervisor when mirroring is on, using $\Delta C_{mirror}$ and Formula (5).

$$C_{mirror\_on\_estimated} = C_{mirror\_off\_hv} + p_{mirror} \times \Delta C_{mirror} \quad (5)$$

Here, $C_{mirror\_off\_hv}$ is the CPU usage rate of a hypervisor when mirroring is off.

However, Formula (5) is applicable when the number of virtual switches to be monitored is one as with the servers 100 and 200. If there is a plurality of virtual switches to be monitored as with the server 300, then in the second term on the right-hand side of Formula (5), $P_{mirror} \times \Delta_{mirror}$ for each virtual switch is summed up. In this case, the CPU usage rate $C_{mirror\_on\_estimated}$ may be expressed by Formula (6).

$$C_{mirror\_on\_estimated} = C_{mirror\_off\_hv} + \Sigma(p_{mirror} \lambda \Delta C_{mirror}) \quad (6)$$

Here, a summation symbol $\Sigma$ of Formula (6) means that a product of $p_{mirror}$ and $\Delta C_{mirror}$ that are obtained for each virtual switch is summed up over all the virtual switches that operate on a hypervisor of interest.

Figure 15:
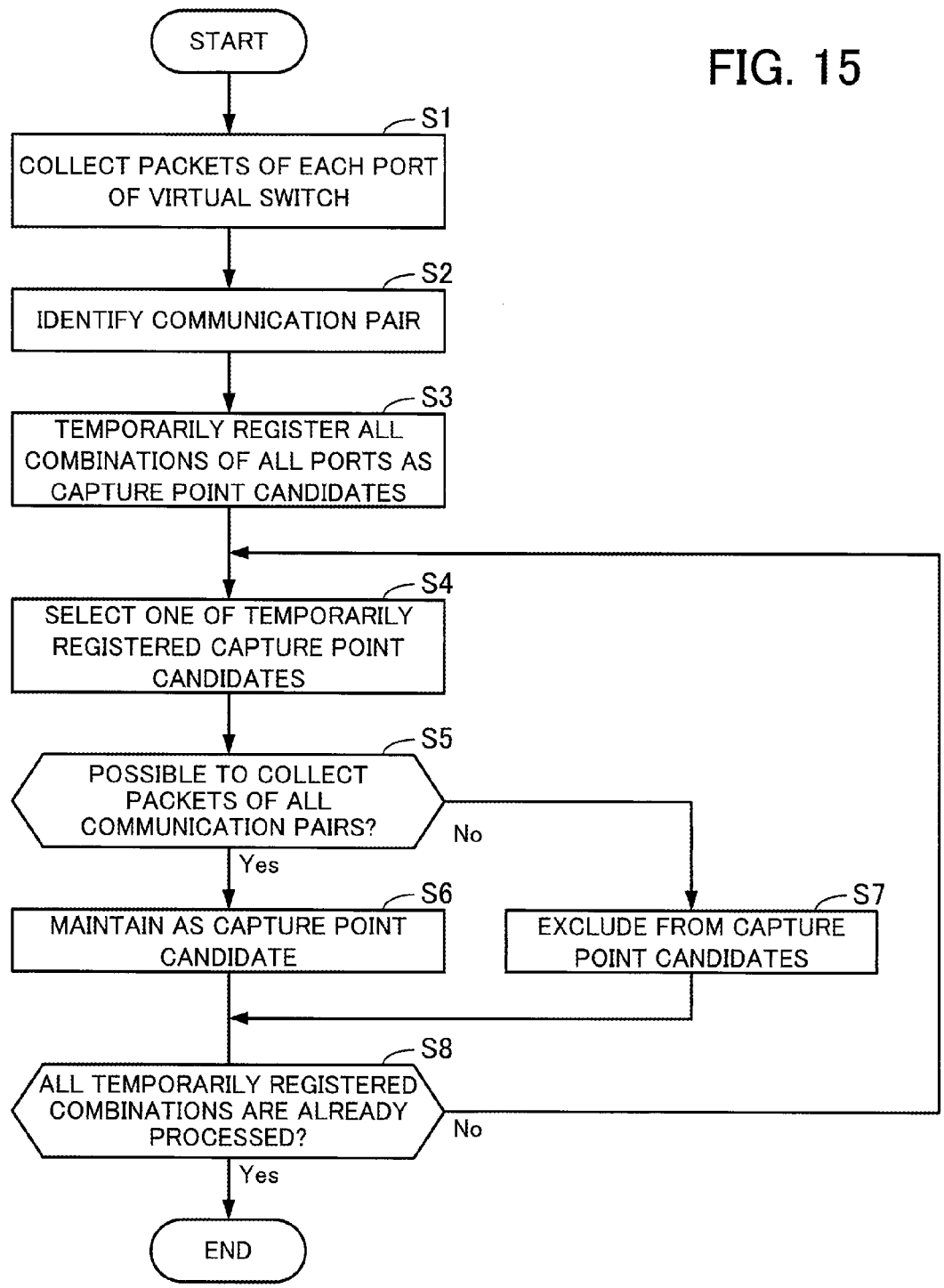
FIG. 15 is a flow chart illustrating an example of determining a capture point candidate.

FIG. 15 is a flow chart illustrating an example of determining a capture point candidate. Hereinafter, the procedure illustrated in FIG. 15 is described along the step numbers.

(S1) The candidate extraction unit 124 causes the packet collection units 123, 223, and 323 to collect the communication data passing through each port (only the port connected to a virtual machine) of the virtual switches 111, 211, 311, and 312 only for a predetermined period by mirroring. After the predetermined period elapses, mirroring may be turned off.

(S2) The candidate extraction unit 124 obtains the destination/source IP addresses of a virtual machine that communicates via each port (port connected to a virtual machine) of the virtual switches 111, 211, 311, and 312, from the packet collection units 123, 223, and 323. The candidate extraction unit 124 identifies, based on the obtained information, a pair (communication pair) of virtual machine and client that communicate via each port, generates the information of a correspondence between the port and the communication pair, and stores the same into the storage unit 122. Furthermore, the candidate extraction unit 124 generates a list of all the communication pairs and stores the same into the storage unit 122. In the case of the second embodiment, all the communication pairs include six pairs of virtual machines that are tied with lines in FIG. 5. Moreover, all the communication pairs include pairs (a total of nine pairs) of any of the clients 500, 600, and 700 and any of the virtual machines 130, 230, and 330. In this case, a total number of communication pairs included in all the communication pairs is 15.

(S3) The candidate extraction unit 124 temporarily registers into the capture point candidate table 122b all the combinations that are obtained by selecting a plurality of ports from all the ports obtained in step S2.

(S4) The candidate extraction unit 124 selects one of the temporarily registered capture point candidates from the capture point candidate table 122b (however, one capture point candidate is selected from unselected ones).

(S5) The candidate extraction unit 124 determines whether or not it is possible to collect the packets of all the communication pairs, which are generated in step S2, with a combination of ports of the selected capture point candidates. When it is possible to collect the packets of all the communication pairs, the procedure is advanced to step S6. When it is not possible to collect the packets of all the communication pairs, the procedure is advanced to step S7. The candidate extraction unit 124 has already known in step S2 a correspondence between a port and a communication pair that may be covered by this port. Accordingly, with reference to the information of this correspondence, the candidate extraction unit 124 determines that when a combination of communication pairs that may be covered by the temporarily registered capture point candidates includes all the communication pairs, it is possible to collect the packets of all the communication pairs. Meanwhile, the candidate extraction unit 124 determines that when a combination of communication pairs that may be covered by the temporarily registered capture-target candidates does not include at least one communication pair of all the communication pairs, it is not possible to collect the packets of all the communication pairs.

(S6) The candidate extraction unit 124 maintains the focused capture point candidate as a capture point candidate. Then, the procedure is advanced to step S8.

(S7) The candidate extraction unit 124 deletes the focused capture point candidate from the capture point candidate table 122b. Then, the procedure is advanced to step S8.

(S8) The candidate extraction unit 124 determines whether or not the step S4 and subsequent steps have been performed on all the capture point candidates temporarily registered in the capture point candidate table 122b. When all the capture point candidates are already processed, the procedure is terminated. When an unprocessed capture point candidate remains, the procedure is advanced to step S4.

In this manner, the server 100 generates the capture point candidate table 122b. Here, only the candidates without duplicated communication are included in the table 122b, but a candidate with duplicated communication may be included. In the above-described step S1, the packet capture is performed on the ports 111b, 111c, 111d, 111e, 211b, 211c, 211d, 211e, 311b, 311c, and 312b that are directly used for communication of a virtual machine to be monitored, while the other ports (e.g., ports 111f, 211f, 311d, and 312c) may be excluded from the targets for packet capture. This is because the packets passing through the other ports are likely to include a relatively large volume of packets of the communication irrelevant to a service desired to be monitored and so the capture amount may increase. However, these ports (e.g., ports 111f, 211f, 311d, and 312c) may be also set to the targets for packet capture to collect packets. Note that, for the above-described method for determining a capture point candidate, see Japanese Laid-open Patent Publication No. 2013-175075.

Figure 16:
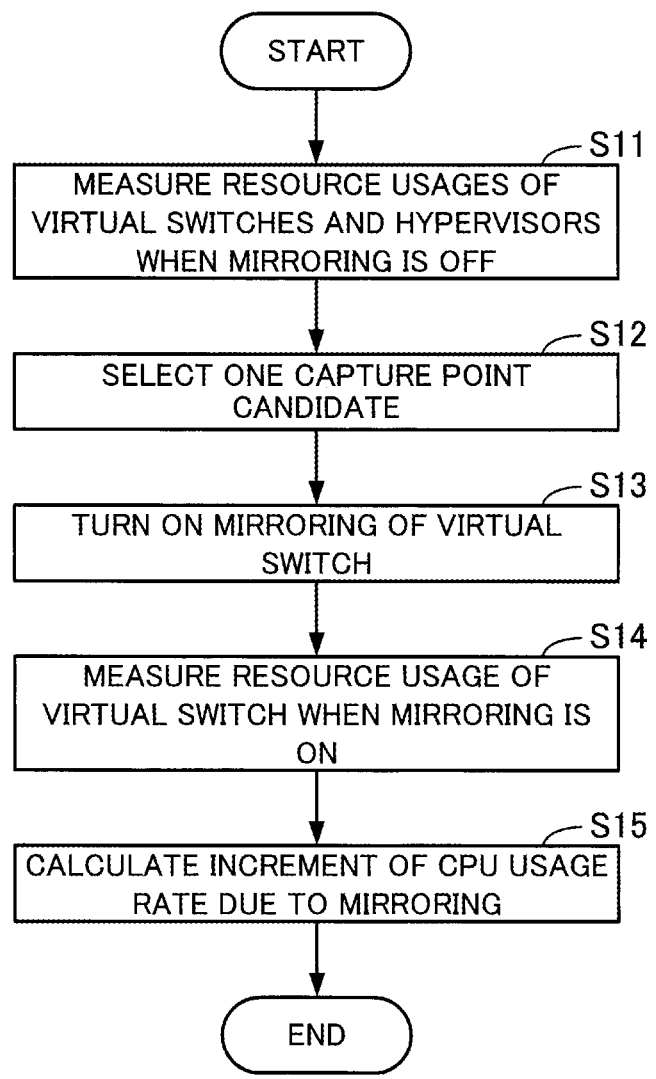
FIG. 16 is a flow chart illustrating an example of calculating $\Delta C_{mirror}$.

FIG. 16 is a flow chart illustrating an example of calculating $\Delta C_{mirror}$. Hereinafter, the procedure illustrated in FIG. 16 is described along the step numbers.

(S11) The server monitor unit 420 measures the resource usages of the virtual switches 111, 211, 311, and 312 and the hypervisors 110, 210, and 310 when mirroring is off. The measurement contents are the number of packets transmitted and received within a predetermined period (e.g., for one minute) via each port (only the port to which a virtual machine to be monitored is connected) of the virtual switches 111, 211, 311, and 312, an average CPU usage rate within this period by each virtual switch, and an average CPU usage rate within this period of the hypervisors 110, 210, and 310. The server monitor unit 420 transmits the measurement results to the load calculation unit 125. The load calculation unit 125 generates the measurement table 122c from the obtained information, and stores the same into the storage unit 122.

(S12) The load calculation unit 125 selects one capture point candidate from the capture point candidate table 122b. The capture point candidate to be selected may be arbitrary. However, the capture point candidate to be selected is a capture point candidate, in which mirroring is performed at any one port in all the virtual switches 111, 211, 311, and 312 connected to a virtual machine involved in the communication to be monitored. For example, the load calculation unit 125 selects a capture point candidate of the candidate number "1".

(S13) The load calculation unit 125 instructs the mirroring setting unit 430 to start the mirroring using a selected capture point candidate. The mirroring setting unit 430 instructs the virtual switches 111, 211, 311, and 312 to start the instructed mirroring targeting a combination of ports included in the specified capture point candidate. Then, the virtual switches 111, 211, 311, and 312 start the instructed mirroring of the specified ports.

(S14) The server monitor unit 420 measures the resource usages of the virtual switches 111, 211, 311, and 312 when mirroring is on. The measurement contents are the number of packets transmitted and received within a predetermined period (e.g., for one minute) via each port (only the port to which a virtual machine to be monitored is connected) of the virtual switches 111, 211, 311, and 312, and an average CPU usage rate within this period by each virtual switch. The server monitor unit 420 transmits the measurement results to the load calculation unit 125. The load calculation unit 125 generates the measurement table 122d from the obtained information, and stores the same into the storage unit 122. After the measurement is completed, the server monitor unit 420 stops the mirroring performed by the virtual switches 111, 211, 311, and 312.

(S15) With reference to the measurement tables 122c and 122d and using Formula (1), the load calculation unit 125 calculates, for each virtual switch, the increment $\Delta C_{mirror}$ of the CPU usage rate due to mirroring per packet. In this case, $p_{mirror}$ (a sum of the numbers of packets passing through the mirroring ports for each virtual switch) may be calculated from the measurement table 122d. The load calculation unit 125 generates the CPU usage rate table 122e based on the calculation result, and stores the same into the storage unit 122.

Note that, in the information processing system of the second embodiment, the procedures of FIGS. 15 and 16 may be executed at least once before executing the procedure below. However, the procedure of FIG. 16 may be periodically executed to periodically update the measurement tables 122c and 122d and the CPU usage rate table 122e.

Next, a packet capture procedure for monitoring the operational status of Web services is described. For example, a system administrator performs input for starting to execute packet capture, with respect to the management server 400. Then, the following procedure is started.

Figure 17:
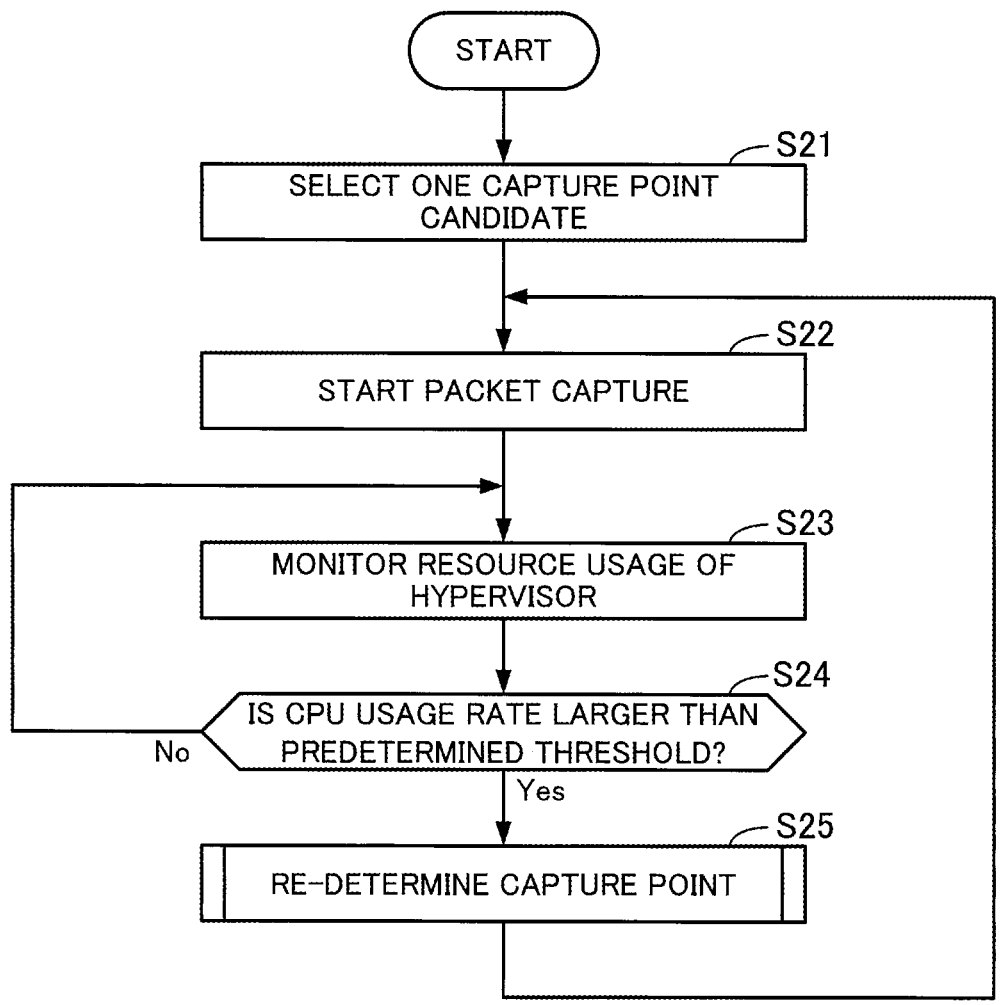
FIG. 17 is a flow chart illustrating an exemplary procedure when packet capture is executed.

FIG. 17 is a flow chart illustrating an exemplary procedure when packet capture is executed. Hereinafter, the procedure illustrated in FIG. 17 is described along the step numbers.

(S21) The mirroring setting unit 430 instructs the virtual machine 120 to select one capture point candidate. The load calculation unit 125 selects one capture point candidate with reference to the capture point candidate table 122b, and notifies the mirroring setting unit 430 of the one capture point candidate. The capture point candidate to be selected may be arbitrary. For example, the load calculation unit 125 selects a capture point candidate of the candidate number "1". The load calculation unit 125 instructs the mirroring setting unit 430 to start the mirroring using the selected capture point candidate. The mirroring setting unit 430 instructs the virtual switches 111, 211, 311, and 312 to start the instructed mirroring targeting a combination of ports included in the specified capture point candidate.

(S22) The virtual switches 111, 211, 311, and 312 start the instructed mirroring of the specified ports. The packet collection units 123, 223, and 323 start packet capture.

(S23) The server monitor unit 420 monitors the resource usages of the hypervisors 110, 210, and 310. The targets to be monitored include the CPU usage rates by the hypervisors 110, 210, and 310.

(S24) The server monitor unit 420 determines whether or not the CPU usage rate by any of the hypervisors 110, 210, and 310 is larger than a predetermined threshold. The threshold of the CPU usage rate may be determined for each of the servers 100, 200, and 300. For example, a threshold of the CPU usage rate 75% is set for each of the servers 100, 200, and 300. When the CPU usage rate by any of the hypervisors is larger than the threshold, the procedure is advanced to step S25. When the CPU usage rate by each of the hypervisors 110, 210, and 310 is equal to or less than the threshold, the procedure is advanced to step S23.

(S25) The server monitor unit 420 instructs the virtual machine 120 to re-determine a capture point. Then, the virtual machine 120 re-determines the capture point according to the procedure described later, and notifies the mirroring setting unit 430 of the re-determined capture point. The mirroring setting unit 430 instructs the virtual switches 111, 211, 311, and 312 to change to a combination of ports included in the re-determined capture point and start mirroring. Then, the procedure is advanced to step S22.

In this manner, the management server 400 attempts to review the capture point in accordance with the CPU usage rates by the hypervisors 110, 210, and 310. Note that, the server monitor unit 420 may make the determination of step S24 at a predetermined cycle, such as at one minute interval.

Figure 18:
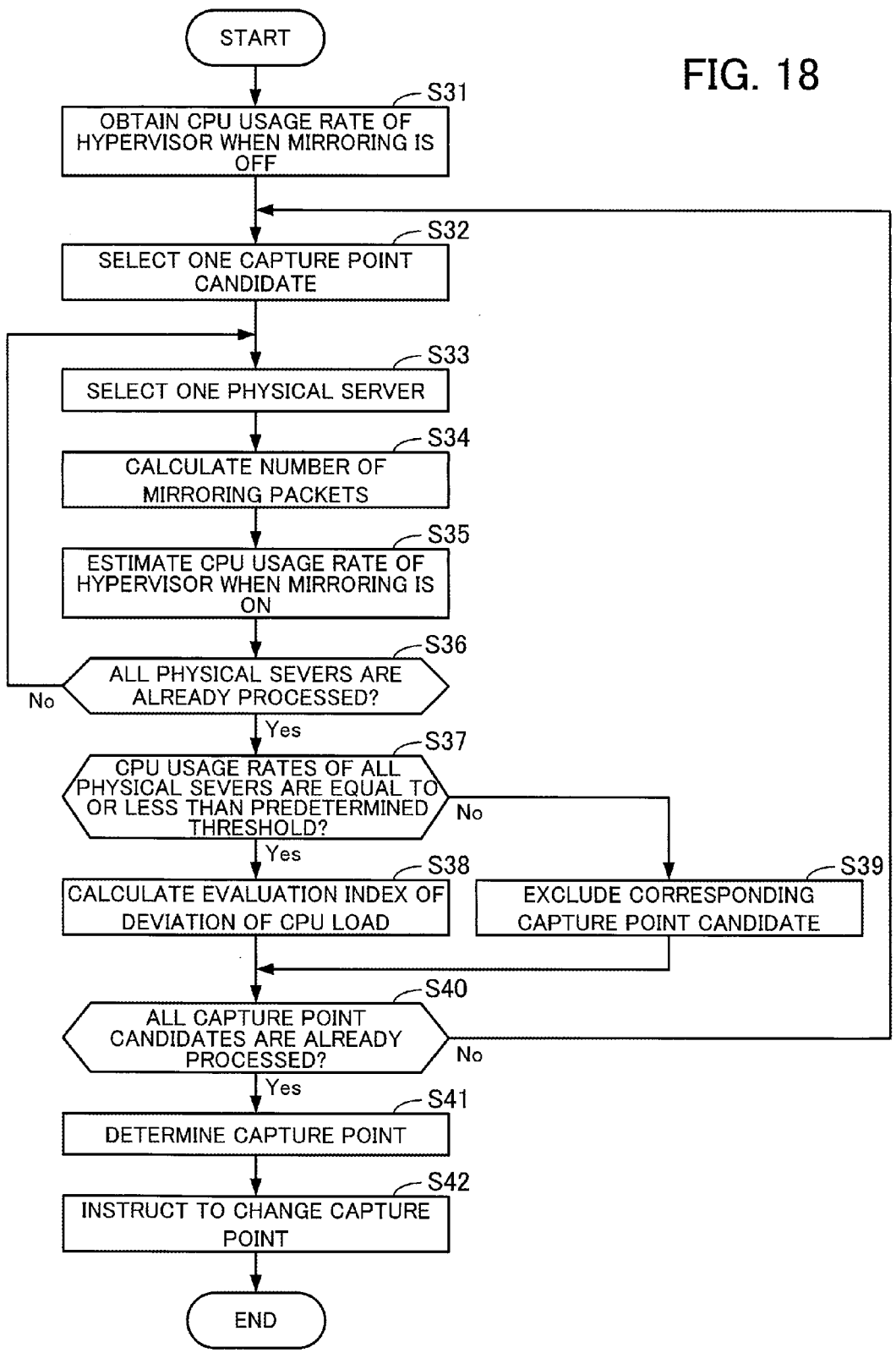
FIG. 18 is a flow chart illustrating an example of re-determining a capture point.

FIG. 18 is a flow chart illustrating an example of re-determining a capture point. Hereinafter, the process illustrated in FIG. 18 is described along the step numbers. The following description is about a procedure corresponding to the step S25 in FIG. 17.

(S31) The capture point determination unit 126 obtains the CPU usage rates by the hypervisors 110, 210, and 310 when mirroring is off, with reference to the measurement table 122c.

(S32) The capture point determination unit 126 selects one capture point candidate with reference to the capture point candidate table 122b. The capture point determination unit 126 may exclude the capture point currently used for packet capture, from the selection targets. For example, if packet capture is currently performed using a capture point candidate of the candidate number "1", the capture point candidates of the candidate number "2" and thereafter may be set to the targets for the procedure below.

(S33) The capture point determination unit 126 selects one of the servers 100, 200, and 300 (physical servers) (however, one server is to be selected from the unselected ones). The capture point determination unit 126 focuses on the hypervisor and virtual switch that operate on the selected server and executes the following steps S34 and S35.

(S34) With reference to the measurement table 122c, the capture point determination unit 126 calculates, for a focused virtual switch, the number of packets (number of mirroring packets) $p_{mirror}$ that serves as the target for mirroring when a focused capture point is selected. For example, if the capture point candidate of the candidate number "2" and virtual switch 111 are focused, the ports 111b, 111d, and 111e (port numbers "2, 4, and 5") are the mirroring ports. Accordingly, for example, the number of mirroring packets of the virtual switch 111 may be calculates as $p_{mirror}$=10000+8000+20000=38000.

(S35) The capture point determination unit 126 calculates the CPU usage rate $C_{mirror\_on\_estimated}$ of a focused hypervisor when mirroring is on, using Formula (5) or Formula (6). Here, the capture point determination unit 126 may use Formula (5) if there is a single virtual switch to be monitored that operates on one server, or may use Formula (6) if there is a plurality of virtual switches to be monitored. A specific example is described later.

(S36) The capture point determination unit 126 determines whether or not $C_{mirror\_on\_estimated}$ is already calculated for all the servers 100, 200, and 300. When it is already calculated, the procedure is advanced to step S37. When there is an uncalculated server, the procedure is advanced to step S33.

(S37) The capture point determination unit 126 determines whether or not the estimated CPU usage rate $C_{mirror\_on\_estimated}$ Of each of the servers 100, 200, and 300 is equal to or less than a predetermined threshold. When all the estimated CPU usage rates $C_{mirror\_on\_estimated}$ are equal to or less than the threshold, the procedure is advanced to step S38. When there is any estimated CPU usage rate $C_{mirror\_on\_estimated}$ larger than the threshold, the procedure is advanced to step S39.

(S38) The capture point determination unit 126 calculates an evaluation index of the deviation of the CPU load using the estimated CPU usage rate $C_{mirror\_on\_estimated}$ of each of the servers 100, 200, and 300. As the evaluation index, a standard deviation or dispersion may be used, for example. The capture point determination unit 126 stores the calculated evaluation index into the storage unit 122 in association with the candidate number of a capture point candidate. Then, the procedure is advanced to step S40.

(S39) The capture point determination unit 126 excludes a currently focused capture point candidate from the selection targets for capture point. The capture point determination unit 126 may delete this capture point candidate from the capture point candidate table 122b. Then, the procedure is advanced to step S40.

(S40) The capture point determination unit 126 determines whether or not all the capture point candidates registered in the capture point candidate table 122b are already processed. When all the capture point candidates are already processed, the procedure is advanced to step S41. When there is any unprocessed capture point candidate, the procedure is advanced to step S32.

(S41) The capture point determination unit 126 determines a capture point from among the capture point candidates based on the evaluation index of the deviation of the load calculated for each capture point candidate. For example, if a standard deviation is calculated as the evaluation index, the capture point determination unit 126 will determine as the capture point a capture point candidate whose standard deviation is the minimum.

(S42) The capture point determination unit 126 notifies the mirroring setting unit 430 of the determined capture point and instructs to change the capture point.

FIG. 19 illustrates an example of estimating the CPU usage rate. In FIG. 19, there is illustrated an estimation example of the CPU usage rates of the hypervisors 110, 210, and 310 when mirroring is on in a case where the capture point candidate of the candidate number "2" in the capture point candidate table 122b is focused. Note that, in FIG. 19, the notation of the CPU usage rate in terms of virtual switch in the measurement table 122c is omitted.

In the capture point candidate of candidate number "2", the ports 111b, 111d, 111e, 211b, 211d, 211e, and 311b are the mirroring ports. The capture point determination unit 126 calculates the estimated CPU usage rate $C_{mirror\_on\_estimated}$ as follows, with reference to the measurement table 122c and the CPU usage rate table 122e.

The number of mirroring packets of the virtual switch 111 is $p_{mirror}$=10000+8000+20000=38000. $C_{mirror\_off\_hv}$=60(%). $\Delta C_{mirror}$=0.00008(%/packet). Substituting these values into Formula (5), the estimated CPU usage rate related to the hypervisor 110 is $C_{mirror\_on\_estimated}$=63.04(%).

The number of mirroring packets of the virtual switch 211 is $p_{mirror}$=12000+11000+25000=48000. $C_{mirror\_off\_hv}$=50 (%). $\Delta C_{mirror}$=0.00008(%/packet). Substituting these values into Formula (5), the estimated CPU usage rate related to the hypervisor 210 is $C_{mirror\_on\_estimated}$=53.84(%).

The number of mirroring packets of the virtual switch 311 is $p_{mirror}$=11000. $C_{mirror\_off\_hv}$=70(%). $\Delta C_{mirror}$=0.00015(%/packet). Substituting these values into Formula (5), the estimated CPU usage rate related to the hypervisor 310 is $C_{mirror\_on\_estimated}$=71.65(%).

Similarly, FIG. 19 also illustrates an estimation example of the CPU usage rates of the hypervisors 110, 210, and 310 when mirroring is on in a case where the capture point candidate of the candidate number "3" in the capture point candidate table 122*b* is focused.

In the capture point candidate of candidate number "3", the ports 111*b*, 111*c*, 211*b*, 211*c*, 311*b*, 311*c*, and 312*b* are the mirroring ports. The capture point determination unit 126 calculates the estimated CPU usage rate $C_{mirror\_on\_estimated}$ as follows, with reference to the measurement table 122*c* and the CPU usage rate table 122*e*.

The number of the mirroring packets of the virtual switch 111 is $p_{mirror}$=10000+5000=15000. $C_{mirror\_off\_hv}$=60(%). $\Delta C_{mirror}$=0.00008(%/packet). Substituting these values into Formula (5), the estimated CPU usage rate related to the hypervisor 110 is $C_{mirror\_on\_estimated}$=61.20(%).

The number of mirroring packets of the virtual switch 211 is $p_{mirror}$=12000+6000=18000. $C_{mirror\_off\_hv}$=50(%). $\Delta C_{mirror}$=0.00008(%/packet). Substituting these values into Formula (5), the estimated CPU usage rate related to the hypervisor 210 is $C_{mirror\_on\_estimated}$=51.44(%).

The number of mirroring packets of the virtual switch 311 is $p_{mirror}$=11000+8000=19000. The number of the mirroring packets of the virtual switch 312 is $p_{mirror}$=45000. $C_{mirror\_off\_hv}$70(%), and $\Delta C_{mirror}$=0.00015(%/packet) for the virtual switches 311 and 312. If these are applied to Formula (6), the estimated CPU usage rate related to the hypervisor 310 is $C_{mirror\_on\_estimated}$=790.60(%).

The capture point determination unit 126 retains the estimated CPU usage rate of each hypervisor in association with the candidate number of a capture point candidate. An estimated CPU usage rate table 122*f* is an example of the data for retaining the estimated CPU usage rate.

Figure 20:
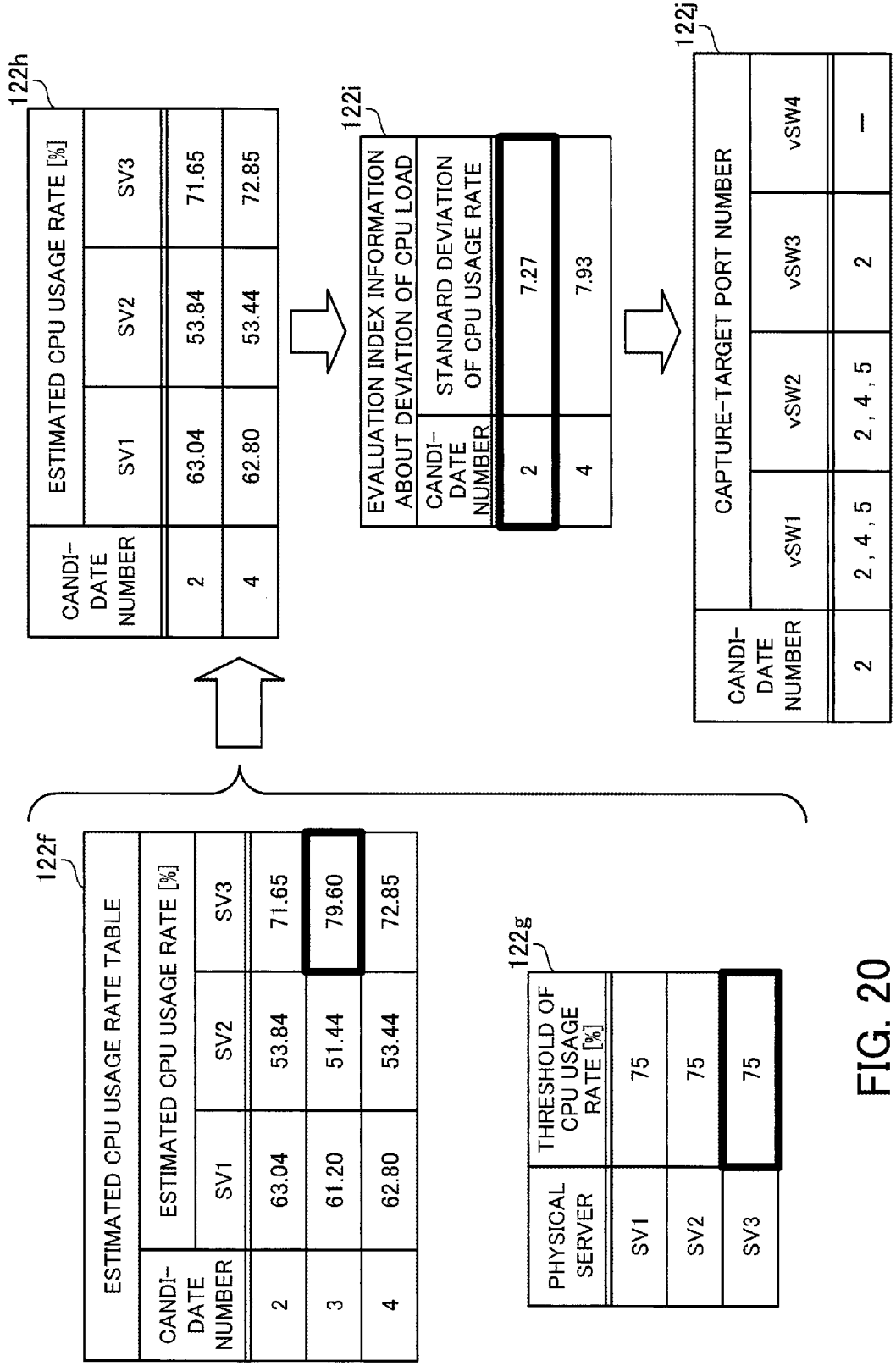
FIG. 20 illustrates an example of determining a capture point.

FIG. 20 illustrates an example of determining a capture point. FIG. 20 illustrates an example of selecting a capture point from among the capture point candidates of the candidate numbers "2, 3, and 4". The capture point determination unit 126 calculates the estimated CPU usage rates of the hypervisors 110, 210, and 310 also for the capture point candidate of the candidate number "4". In the estimated CPU usage rate table 122*f*, with respect to the capture point candidates of the candidate numbers "2, 3, and 4", the results of calculating the estimated CPU usage rates of the hypervisors 110, 210, and 310 are registered.

When the estimated CPU usage rates of the hypervisors 110, 210, and 310 exceed a threshold of the CPU usage rate for each of the hypervisors 110, 210, and 310, the capture point determination unit 126 excludes a corresponding capture point candidate from the selection targets for capture point. In the example of FIG. 20, when the capture point candidate of the candidate number "3" is adopted, the estimated CPU usage rate 79.60(%) of the server 300 (i.e., hypervisor 310) is higher than the threshold 75(%). Therefore, the capture point determination unit 126 excludes the capture point candidate of the candidate number "3" from the selection targets for capture point. An estimated CPU usage rate table 122*h* is an example when the record of the candidate number "3" is deleted from the estimated CPU usage rate table 122*f*.

The capture point determination unit 126 calculates, for each capture point candidate, the evaluation index (here, the standard deviation) of the deviation of the CPU load based on the estimated CPU usage rate table 122*f*. Evaluation index information 122*i* illustrates an example of the results of calculating the standard deviation. In this case, a standard deviation "7.27" for the candidate number "2" is smaller than a standard deviation "7.93" for the candidate number "4". The standard deviation of the candidate number "2" is the smallest among the standard deviations for the respective candidate numbers.

A smaller standard deviation provides a smaller variation of the estimated CPU usage rates of the hypervisors 110, 210, and 310. It is expected that by selecting a capture point candidate having a smaller variation of the estimated CPU usage rates, the CPU load by the hypervisors 110, 210, and 310 (i.e., servers 100, 200, and 300) in mirroring may be equalized.

Therefore, the capture point determination unit 126 determines the capture point candidate 122*j* of the candidate number "2" as the capture point. Then, the capture point determination unit 126 instructs the mirroring setting unit 430 to change the capture point.

Note that, in the above procedure, a case is assumed where a capture point is re-set, but for example prior to step S22 in FIG. 17, the determination (in this case, the expression "determination" is more appropriate than the expression "re-determination") of capture point in step S25 may be performed.

Moreover, the procedure of FIG. 16 may be incorporated into the procedure of FIG. 17 and performed. For example, in response to an instruction to start mirroring made by a system administrator or the like, steps S21 and S22 may be executed after step S11, and steps S14 and S15 may be executed prior to step S23 or in parallel to step S23. In this case, steps S12 and S13 will be skipped.

As described above, according to the information processing system of the second embodiment, the loads on the servers 100, 200, and 300 that execute a virtual machine to be monitored may be equalized.

Here, when the collection of packets is shared and executed by a plurality of physical servers, the number of packets to be duplicated/collected on any of the physical servers might increase and the load might be biased to this physical server. This is because the transmitted and received amount of packets between virtual machines differs with a function realized by a virtual machine, the frequency of use of a virtual machine, or the like, and focusing attention on the port of a virtual switch, there are various ports, such as a port having a relatively high communication traffic and a port having a relatively low communication traffic.

In particular, When the CPU resource of a hypervisor is depressed due to mirroring in any of the virtual machines, the Web service to be monitored and/or the performance of another virtual machine operating on this hypervisor might be affected. For example, a communication delay between virtual machines, a degradation in the performance of write/read processing on a disk (a local storage, a network storage, or the like), and the like might occur.

In contrast, by appropriately selecting a capture point, a load may be prevented from biasing to a specific physical server. However, it is not easy to directly measure how much the load on a CPU due to mirroring is in each physical server.

Then, in the method of the first embodiment, with respect to a plurality of candidates for capture point, the usage of a CPU by each hypervisor when each candidate is adopted is estimated. This enables to select a capture point with a smaller deviation (variation) in the usage of a CPU by each hypervisor.

In this case, an increment of the usage rate of a CPU due to a switch needed for mirroring per packet is calculated. Therefore, from the number of packets passing through each port (corresponding to the number of packets to be collected when the each port is set to the target for mirroring), the usage rate of a CPU by each hypervisor when each candidate for capture point is adopted may be estimated. Accordingly, there is no need to measure, for all the candidates for capture point, the usage of a CPU of a hypervisor when mirroring is on and when mirroring is off. Therefore, a capture point may be determined efficiently.

In the description of the second embodiment, it is assumed that the candidate extraction unit 124, the load calculation unit 125, and the capture point determination unit 126 are provided in the virtual machine 120. Meanwhile, the candidate extraction unit 124, the load calculation unit 125, and the capture point determination unit 126 may be provided in the management server 400.

Note that, the information processing of the first embodiment may be realized by causing the processor 1*b* or a processor of each of the physical machines 2, 3, and 4 to execute programs. The information processing of the second embodiment may be realized by causing a CPU of each of the servers 100, 200, and 300 or management server 400 to execute programs. The programs may be stored on computer-readable storage media (e.g., the storage medium 13).

For example, the programs may be distributed by distributing the storage media having the programs stored thereon. Moreover, the programs may be stored in another computer and distributed to other computers via a network. For example, the computer may store (install) the programs stored on storage media or the programs received from other computers into a storage device, such as the RAM 102 or the HDD 103, and read the programs from the storage device and executes the same.

According to one aspect of the embodiments, the load on each physical machine may be equalized.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A capture point determination method in a system including a first physical machine including a first processor and a plurality of second physical machines each including a second processor capable of executing a hypervisor that operates virtual machines and a virtual switch, the method comprising:

obtaining, by the first processor, a plurality of candidates for a combination of ports of each virtual switch through which packets transmitted and received between the virtual machines are collected, and calculating, for each virtual switch, an increment of a usage of the second processor in accordance with a number of packets to be collected, by using a usage of the second processor by the virtual switch and a number of packets passing through each port when mirroring is executed and when mirroring is not executed, respectively;

calculating, by the first processor, for each of the second physical machines, a usage of the second processor by the hypervisor when mirroring is executed, by using a calculated increment of a usage of the second processor by the virtual switch and a usage of the second processor by the hypervisor when mirroring is not executed, for each of the plurality of candidates; and determining, by the first processor, a combination of ports used for collection of packets, from among the plurality of candidates in accordance with a deviation of the usage of the second processor by each hypervisor calculated for each candidate.

2. The capture point determination method according to claim 1, wherein the determining includes selecting a candidate in which a standard deviation or dispersion of a usage of the second processor by each hypervisor when mirroring is executed becomes the smallest.

3. The capture point determination method according to claim 1, wherein the determining includes excluding a candidate in which a usage of the second processor by any hypervisor when mirroring is executed is larger than a threshold, from the plurality of candidates for selection.

4. The capture point determination method according to claim 1, wherein the calculating includes:

calculating a usage of the second processor of the virtual switch due to mirroring from a usage of the second processor of the virtual switch when mirroring is not executed and when mirroring is executed and a number of packets passing through a mirroring port when mirroring is not executed and when mirroring is executed; and calculating, based on the calculation result, an increment of the usage of the second processor by the virtual switch in accordance with a number of packets to be collected.

5. The capture point determination method according to claim 1, wherein the calculating includes calculating a usage of the second processor by a hypervisor by adding a value, which is obtained by multiplying an increment of the usage of the second processor by a virtual switch associated with mirroring of a predetermined number of packets by a number of packets passing through a mirroring port, and a usage of the second processor by the hypervisor when mirroring is not executed.

6. A capture point determination system comprising:

a first physical machine including a first processor; and a plurality of second physical machines each including a second processor capable of executing a hypervisor that operates virtual machines and a virtual switch, wherein the first physical machine performs a process including:

obtaining a plurality of candidates for a combination of ports of each virtual switch through which packets transmitted and received between the virtual machines are collected, and calculating, for each virtual switch, an increment of a usage of the second processor in accordance with a number of packets to be collected, by using a usage of the second processor by the virtual switch and a number of packets passing through each port when mirroring is executed and when mirroring is not executed, respectively;

calculating, for each of the second physical machines, a usage of the second processor by the hypervisor when mirroring is executed, by using a calculated increment of a usage of the second processor by the virtual switch and a usage of the second processor by the hypervisor when mirroring is not executed, for each of the plurality of candidates; and determining a combination of ports used for collection of packets, from among the plurality of candidates in accordance with a deviation of the usage of the second processor by each hypervisor calculated for each candidate.

7. A non-transitory computer-readable storage medium storing a computer program that causes a computer used as a first physical machine including a first processor in a system including the first physical machine and a plurality of second physical machines each including a second processor capable of executing a hypervisor that operates virtual machines and a virtual switch to perform a process comprising:

obtaining a plurality of candidates for a combination of ports of each virtual switch through which packets transmitted and received between the virtual machines are collected, and calculating, for each virtual switch, an increment of a usage of the second processor in accordance with a number of packets to be collected, by using a usage of the second processor by the virtual switch and a number of packets passing through each port when mirroring is executed and when mirroring is not executed, respectively;

calculating, for each of the second physical machines, a usage of the second processor by the hypervisor when mirroring is executed, by using a calculated increment of a usage of the second processor by the virtual switch and a usage of the second processor by the hypervisor when mirroring is not executed, for each of the plurality of candidates; and determining a combination of ports used for collection of packets, from among the plurality of candidates in accordance with a deviation of the usage of the second processor by each hypervisor calculated for each candidate.

* * * * *